(12) United States Patent
Kamiya

(10) Patent No.: US 6,338,556 B1
(45) Date of Patent: Jan. 15, 2002

(54) RIM LOCK OF GLASSES FRAME AND GLASSES FRAME

(75) Inventor: Kaoru Kamiya, Aichi (JP)

(73) Assignee: Meganeryutsusenta Co., Ltd., Aichi (JP)

( * ) Notice: Subject to any disclaimer, the term of this patent is extended or adjusted under 35 U.S.C. 154(b) by 0 days.

(21) Appl. No.: 09/530,449
(22) PCT Filed: Feb. 19, 1999
(86) PCT No.: PCT/JP99/00766
§ 371 Date: May 1, 2000
§ 102(e) Date: May 1, 2000
(87) PCT Pub. No.: WO00/43824
PCT Pub. Date: Jul. 27, 2000

(30) Foreign Application Priority Data

Jan. 25, 1999 (JP) .............................. 11-016313

(51) Int. Cl.⁷ .................................. G02C 1/08
(52) U.S. Cl. ............................ 351/92; 351/90; 351/95; 351/97
(58) Field of Search ..................... 381/90, 91, 92, 381/93, 94, 95, 96, 97, 98, 99

(56) References Cited

U.S. PATENT DOCUMENTS 4,813,775 A * 3/1989 Kaksonen ............... 351/92

FOREIGN PATENT DOCUMENTS

| JP | 50-138948 | 11/1975 |
|----|-----------|---------|
| JP | 60-49521 | 4/1985 |
| JP | 60-49522 | 4/1985 |
| JP | 4-50917 | 2/1992 |

* cited by examiner

Primary Examiner—Hung Xuan Dang
(74) Attorney, Agent, or Firm—Nixon & Vanderhye P.C.

(57) ABSTRACT

To provide a closing block of the frame wherein the lens can be tightly fixed to the rim without rattling and the installing/removing of the lens can be easily operated even if the process precision of the outer shape of the lens is worse. The locking part 10 provided to the lower end portion 3c of the rim 3 is loosely inserted to the loose insert groove 9f of the locking part 9 that is fixed to the upper end portion 3b of the rim 3, and the locking part 10 is urged toward the upper end portion 3b of the rim 3 by the elastic part 11 that is provided between the bottom wall plate 9d of the locking part 9 and the locking part 10. By the urging force the lens 2 to be inserted to the rim 3 is certainly fixed to the rim 3. Moreover, because the inner shape of the rim 3 is expanded by pulling out the cut 3a of the rim 3 and is shrunk via the elastic part 11 by releasing the cut 3a, the lens 2 can be exchanged without using an exclusive screwdriver. Therefore, the closing block of the frame wherein the lens can be certainly fixed to the rim and the installing/removing of the lens can be easy is obtained.

19 Claims, 13 Drawing Sheets

RIM LOCK OF GLASSES FRAME AND GLASSES FRAME

BACKGROUND OF THE INVENTION

1. Field of the Invention

The present invention is related to a closing block of a frame of glasses, and especially related to a closing block of a frame of glasses being capable of fixing easily a lens into a rim without using a screw part such as a screw.

2. Description of the Related Art

The closing block for fixing a lens into a rim of the frame of the glasses has been generally mounted in adjacent to a connecting part with an endpiece of the rim or a cut surface (a cut) that is made by cutting the adjacent part of the connecting part with a bridge of the rim. The closing block mainly comprises a pair of locking pieces each of which being fixed respectively to each end part of the cut of the rim and a screw part such as a screw for connecting the pair of locking pieces. In the closing block, after the lens is inserted in the rim and when the pair of locking pieces are put together and the screw part is screwed to be fastened tight into the both locking pieces, the pair of locking pieces are connected and the lens is fixed into the rim.

However, in the above-described closing block, when the outer shape of the lens is processed with low precision, a space is made between the rim and the lens. Thereby, the lens moves with rattling in the rim and the lens cannot be fixed tightly. Because the pair of locking pieces are connected with the screw part, a special tool such as an exclusive screwdriver is necessary for screwing down or screwing up the screw part when the lens is mounted in and removed from the rim, thereby it has been troublesome. Moreover, the screw part is gradually loosened during the use of the glasses and the lens is removed from the rim. The screw part can be fixed into the pair of locking pieces with an adhesive agent such as a screw agent, however, in this case, the screw part cannot be removed from the both locking pieces and the lens cannot be exchanged.

An object of the present invention is to provide a locking block of a frame of glasses being capable of fixing the lens into the rim tightly even if the process precision of the outer shape of the rim is worse and wherein a lens can be easily mounted thereto and removed therefrom.

SUMMARY OF THE INVENTION

To achieve the above-described object, a closing block of a frame of glasses of first invention for fixing a lens into a rim a part of which is cut comprises a first locking part fixed to one end side of the cut of said rim, a second locking part provided to another end side of the cut of said rim and loosely inserted between said first locking part and the one end side of said rim and an urging part provided between said first locking part and said second locking part and for urging said second locking part to the one end side of said rim.

According to the closing block of the frame of first invention, when the both end sides of the cut of the rim are pulled to be open, the second locking part loosely inserted between the first-locking part and one end side of the rim presses the urging part and is moved toward the first locking part. When another end side of the rim is separated from one end side of the rim by the movement of the second locking part, the cut of the rim is open and the inner shape of the rim is expanded. In this condition, a lens is inserted to the rim and when the rim that has been pulled out is released, the second locking part is urged to one end side of the rim by the urging force of the urging part and the second locking part is moved to one end side of the rim by the urging force. By the movement, the cut of the rim is closed and the inner shape of the rim is shrunk and the lens inserted to the rim is fixed.

In a closing block of a frame of second invention according to the closing block of the frame of the first invention, said first locking part has a pair of guide parts for holding one of said second locking part and the another end side of said rim to guide it slidably to the one end side of said rim.

In a closing block of a frame of third invention according to the closing block of the frame of second invention, said guide parts has a guide groove formed along a moving direction of one of said second locking part and the another end side of said rim, and the closing block of the frame of third invention further comprises a stop projection slidably fitted into said guide groove being formed on one of said second locking part and the another end side of said rim.

The closing block of the frame of third invention operates as same as the closing block of the frame of second invention. Moreover, in the closing block of the frame of third invention, the stop projection formed to one of the second locking part and another end side of the rim is inserted to the guide groove and moved when one of the second locking part and another end side of the rim is guided to one end side of the rim. By the insertion of the stop projection into the guide groove, it is prevented that the second locking part is dropped out from between the first locking part and one end side of the rim when one of the second locking part and another end side of the rim is moved.

In a closing block of a frame of fourth invention according to the closing block of the frame of second invention or third invention, said first locking part has a restricting part for restricting a moving position of one of said second locking part and the another end side of said rim.

In a closing block of a frame of fifth invention according to the closing block of the frame of one of first to fourth inventions, said urging part is provided to said second locking part.

The closing block of the frame of fifth invention operates as same as the closing block of the frames of first to fourth inventions. Moreover, in the closing block of the frame of fifth invention, because the urging part is provided between the first locking part and the second locking part, when the second locking part is loosely inserted between the first locking part and one end side of the rim, the urging part is installed between the first locking part and the second locking part by the loose insertion. That is, the loose inserting operation of the second locking part between the first locking part and one end side of the rim and the installing operation of the urging part between the first locking part and the second locking part can be made at the same time.

In a closing block of a frame of sixth invention according to the closing block of the frame of one of first to fifth inventions, said first locking part has a guide rail part formed between said first locking part and the one end side of said rim along an urging direction of said urging part and the closing block of the frame of sixth invention further comprises an insert hole where said guide rail part can be inserted being formed on one of said second locking part and the another end side of said rim.

The closing block of the frame of sixth invention operates as same as the closing block of the frames of first to fifth inventions. Moreover, in the closing block of the frame of sixth invention, the guide rail part of the first locking part is inserted to the insert hole formed on one of the second locking part and another end side of the rim. Therefore, the movement of the second locking part toward one end side of the rim is guided by the guide rail part and it is prevented that the second locking part is dropped out from between the first locking part and one end side of the rim.

A closing block of a frame of seventh invention according to the closing block of the frame of sixth invention further comprises a stop hole where said guide rail part can be inserted being formed on said urging part.

A closing block of a frame of glasses of eighth invention is for fixing a lens into a rim a part of which is cut and comprises a fist locking part provided to one end side of a cut of said rim, a second locking part provided to another end side of the cut of said rim, and an urging part provided between said first locking part and said second locking part for urging one of said first locking part and said second locking part toward another one of said first locking part and said second locking part.

In the closing block of the frame of eighth invention, when the both end sides of the cut of the rim are pulled out to be opened, the urging part provided between the first locking part and the second locking part is pulled out and the cut of the rim is opened and the inner shape of the rim is expanded. In this condition, a lens is inserted to the rim and when the rim that has been pulled is released, one of the first locking part and the second locking part is urged toward another one of the first locking part and the second locking part and the cut of the rim is closed and the inner shape of the rim is shrunk, so that the lens inserted to the rim is fixed.

A closing block of a frame of ninth invention according to the closing block of the frame of eighth invention further comprises a first fixing part provided to said first locking part, a second fixing part provided to said second locking part, and a pair of stop parts provided on each end side of said urging part in its urging direction and being stopped to said first fixing part and said second fixing part.

The closing block of the frame of ninth invention operates as same as the closing block of the frame of eighth invention. Moreover, in the closing block of the frame of ninth invention, when the urging part is installed between the first locking part and the second locking part, a pair of stop parts of the urging part are stopped to the first and second fixing parts.

In a closing block of a frame of tenth invention according to the closing block of the frame of eighth invention or ninth invention, facing surfaces of said first locking part and said second locking part are formed in an uneven shape mating with each other.

In a closing block of a frame of eleventh invention according to the closing block of the frame of one of first to tenth inventions the closing block is provided to a clincher endpiece.

A closing block of a frame of twelfth invention according to the closing block of the frame of one of first to tenth inventions further comprises a pair of rims where a lens is inserted and a bridge for connecting the pair of rims, and wherein the closing block is provided to a connecting part of said bridge and said rims.

Further objects, details and advantages of the invention will be apparent from the following detailed description, when read in conjunction with the drawings.

EXPLANATION OF THE MARKS

Figure 1:
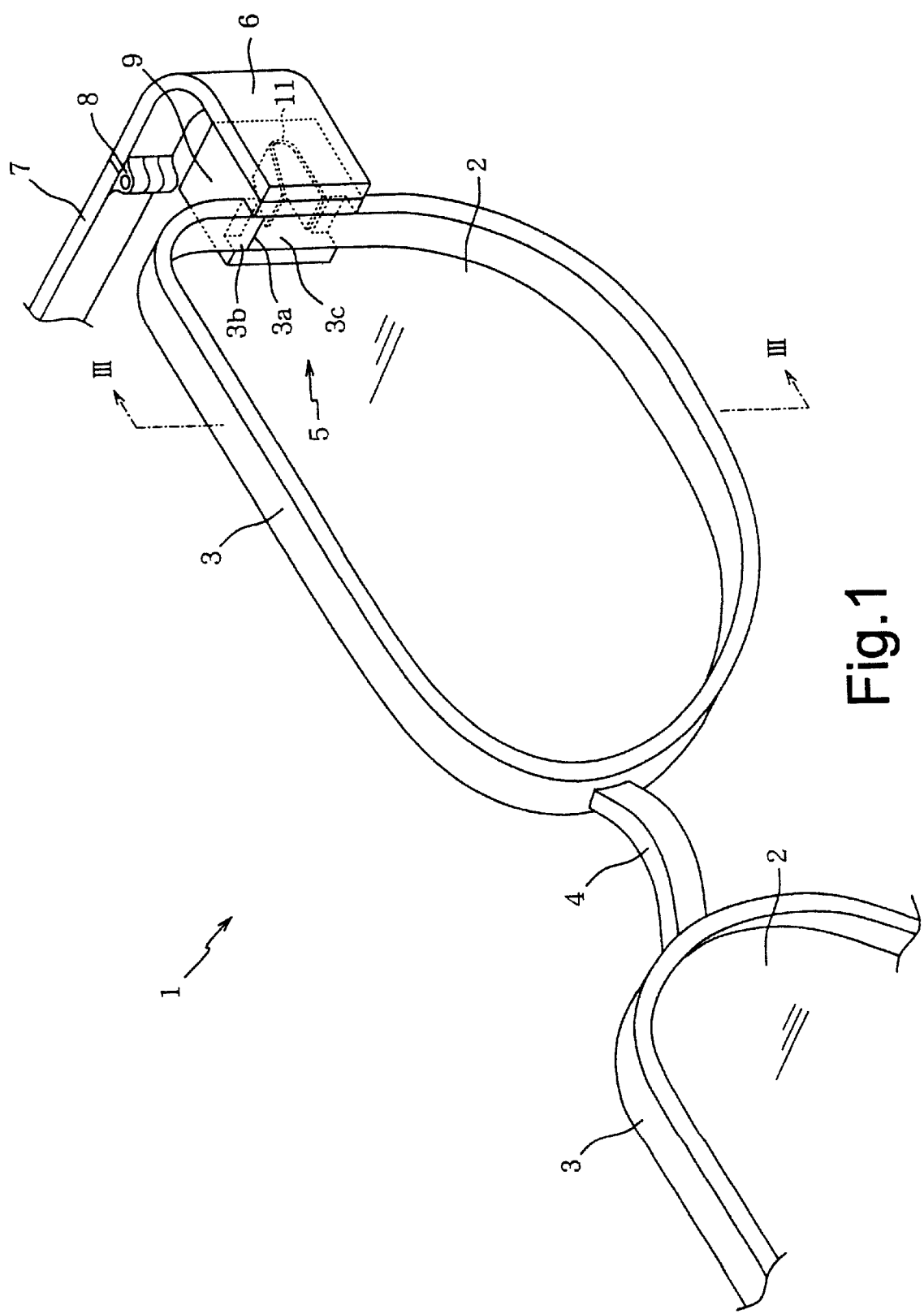
FIG. 1 is a partial outer perspective view of the frame of the glasses wherein the closing block of the first preferred embodiment is used.

1, 20, 30, 40, 50, 60, 70 frame of the glasses
2 lens
3 rim
3$a$ cut (cut of the rim)
3$b$ upper end portion (a part of the restricting part, a part of the canopy plate)
4 bridge
5, 21, 31, 41, 51, 61, 71 closing block
6 clincher endpiece (endpiece)
9, 10 locking part (first locking part, second locking part)
9$f$ loose insert groove (space between the first locking part and one end part of the rim)
9$b$, 9$c$, guide plate (a part of the side wall plate, a pair of side wall plates covering the both end sides of the loose insert groove)
9$b$1, 9$c$1 guide groove
9$a$ canopy plate (a part of the restriction part)
10$c$, 10$d$ movable pin (stop projection)
93$b$, 93$c$ movable pin (stop projection)
82$b$1, 82$c$1, 83$b$1, 83$c$1 insert groove (first fixing part, second fixing part)
11 elastic part (urging part)
22, 32, 42, 52, 62, 72, 84 elastic part (urging part)
32$a$ internal circumference part (stop hole)

80, 90, 100 frame of the glasses
81, 91, 101 closing block
82, 83, 92, 102, 103 locking part (first locking part, second locking part)
82f lower end surface (facing surface of the first and second locking parts)
83f upper end surface (facing surface of the first and second locking parts)
103a insert hole
104 guide pin (guide rail part)

DETAILED DESCRIPTION OF THE PREFERRED EMBODIMENTS

The preferred embodiments embodying the present invention will be explained referring the attached figures. FIG. 1 is a partial outer perspective view of the frame of the glasses wherein a closing block 5 of the first preferred embodiment is used. As shown in FIG. 1, a frame 1 of the glasses is a metal frame made from a metal material symmetrically. The frame 1 comprises a pair of rims 3, 3 where lenses 2 are mounted, a bridge 4 for connecting the pair of rims 3, 3, a closing block 5 for fixing the lens into the rim 3, a clincher endpiece 6 fixed to the closing block 5, a temple 7 connected to the clincher endpiece 6 and a hinge 8 for slidably connecting the temple 7 to the clincher endpiece 6. In FIG. 1, a part of the rim 3 mounted in the left side of the frame 1 is omitted and the closing block 5, the clincher endpiece 6, the temple 7 and hinge 8 are omitted.

The lenses 2 are mounted (inserted) in the inner circumference part of the pair of the rims 3, 3 and the pair of the rims 3, 3 are formed from a metal material to be almost a round shape seen from the front. The pair of rims 3, 3 are formed symmetrically and they are connected by the bridge 4. The bridge 4 is a part for connecting the pair of rims 3, 3, and its one end is connected to the rim 3 of the right side of the frame 1 (the right side in FIG. 1) by solder and its another end is connected to the rim 3 of the left side of the frame 1 (the left side in FIG. 1) by solder.

Because the frame 1 is formed symmetrically, the rim 3, the closing block 5, the clincher endpiece 6, the temple 7 and the hinge 8 mounted in the right side of the frame 1 are explained.

A frame part of the rim 3 that is an opposite side (the right side in FIG. 1) of a frame part of the rim 3 connected to the bridge 4 is cut and a cut 3a is formed. The rim 3 is separated from the cut 3a into an upper end portion 3b and a lower end portion 3c. A locking part 9 of the closing block 5 (described later) is fixed to the upper end portion 3b by solder and the locking part 10 (described later)(refer FIG. 2) is mounted to the lower end portion 3c. The closing block 5 is explained in detail later.

One end of the clincher endpiece 6 is fixed to a front surface of the locking part 9 of the closing block 5 by solder. The clincher endpiece 6 is a part for connecting the rim 3 and the temple 7, and its end side opposite to its end side fixing to the locking part 9 is bent toward the rear side of the frame 1 (the backward in FIG. 1) in almost L-shape seen from the upper side. The temple 7 hung on the user's ear is slidably connected to the top end of the bent part of the clincher endpiece 6 (the backward in FIG. 1) via the hinge 8, and the temple 7 is extended to the rear side of the frame 1.

Figure 2:
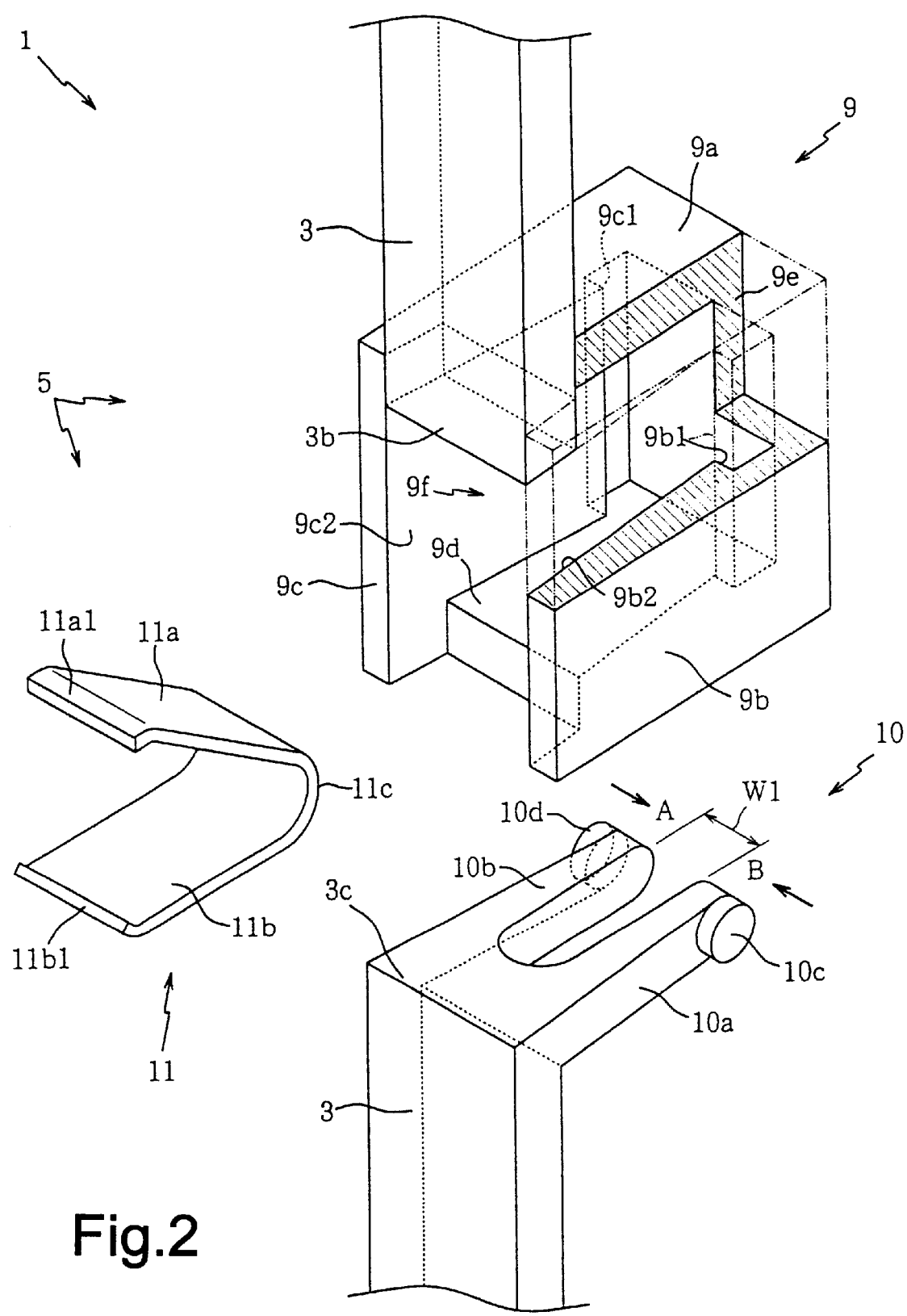
FIG. 2 is an exploded perspective view of the closing block.
Figure 3:
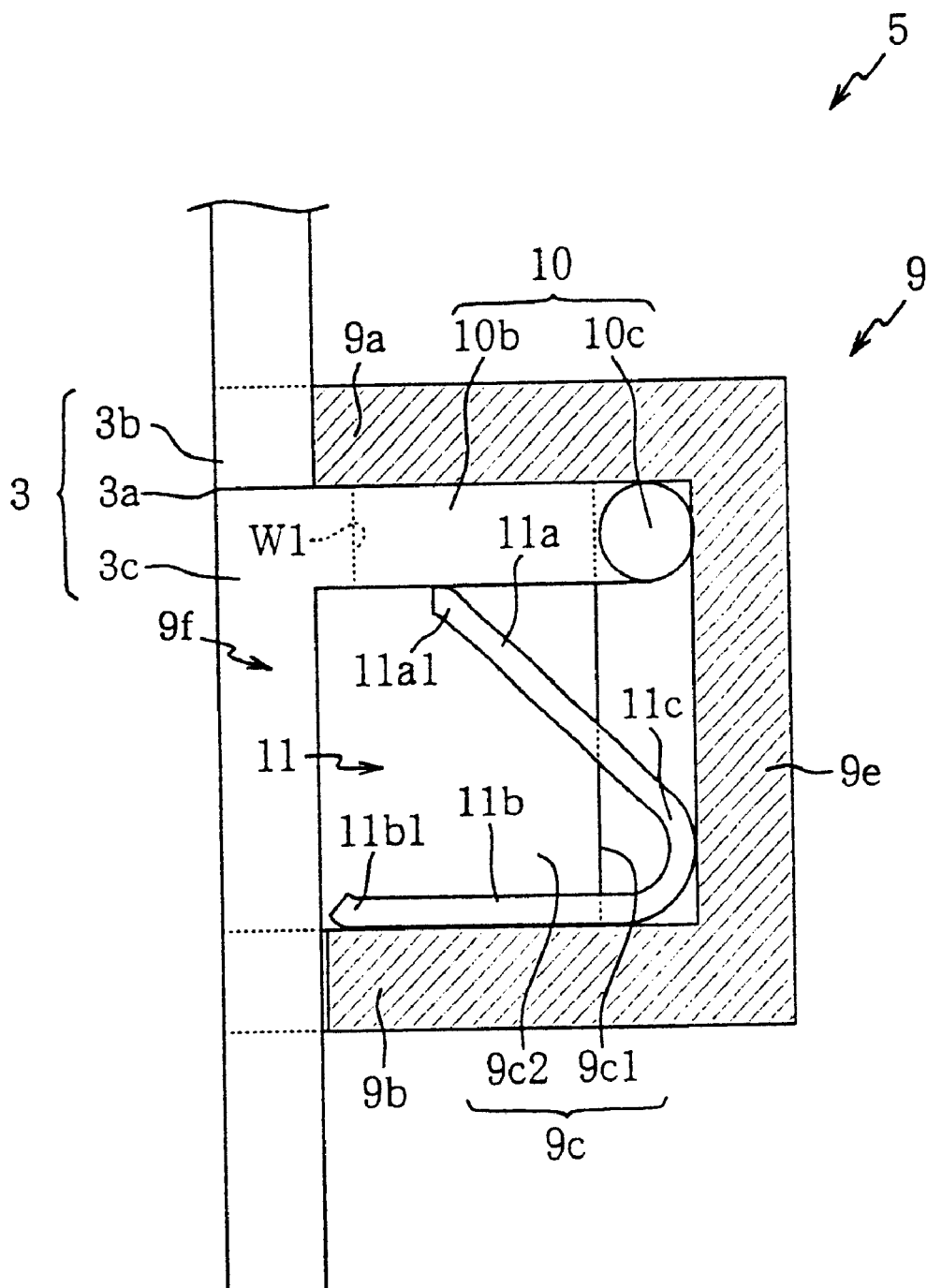
FIG. 3 is a partial cross sectional view from the III—III line of FIG. 1.

Next, the closing block 5 is explained in detail referring FIGS. 2 and 3. FIG. 2 is an exploded perspective view of the closing block 5, and FIG. 3 is a partial cross sectional view from the III—III line of FIG. 1. In FIG. 2, the locking part 9 is partially seen from its cross section and a part of the locking part 9 is shown by a two-dot chain line. In FIG. 2 and FIGS. 3–10 (described later), the lenses 2, the clincher endpiece 6, the temple 7 and the hinge 8 are omitted.

As shown in FIG. 2, the closing block 5 mainly comprises the locking part 9 of almost a rectangular parallelepiped shape fixed to the upper end portion 3b of the rim 3, the locking part 10 mounted to the lower end portion 3c of the rim 3, and an elastic part 11 having elastic recovering force for urging the locking part 10 upward that is toward the upper end portion 3b of the rim 3.

The locking part 9 has a canopy plate 9a of a plate shape in its upper part, and guide plates 9b, 9c of a plate shape are extended downward from the both end sides of the canopy plate 9a (the both end sides in the front-rear direction in FIG. 2). The lower ends of the pair of guide plates 9b, 9c are connected by a bottom plate 9d of a plate shape, and a side plate (a part of the wall plate) 9e of a plate shape is connected to the right side (the right side in FIG. 2) of the four plates of the canopy plate 9a, the guide plates 9b, 9c and the bottom plate 9d. Thereby, the locking part 9 is formed in a rectangular parallelepiped shape that has one side is open (the left side in FIG. 2) by the five plates of the canopy plate 9a, the guide plates 9b, 9c, the bottom plate 9d and the side plate 9e, and a loose insert groove 9f is formed for communicating from the open part to the inner part.

The locking part 10 (described later) is inserted loosely in the loose insert groove 9f so as to be movable up and down and the loose insert groove 9f is formed in a long groove shape in the up and down direction of the locking part 9 (the up and down direction in FIG. 2). The above-described canopy plate 9a is provided on the upper part of the loose insert groove 9f and the upward movement position of the locking part 10 (described later) can be restricted by the canopy plate 9a.

The upper end portion 3b of the rim 3 is fixed by solder to the left side (the left side in FIG. 2) of the canopy plate 9a that is the rim 3 side of the canopy plate 9a so as to be held between the pair of guide plates 9b, 9c. The lower surface of the canopy plate 9a is flush with the lower surface of the upper end portion of the rim 3 (refer FIG. 3), and the upward movement position of the lower end portion 3c of the rim 3 can be restricted by contacting the upper surface of the lower end portion 3c with the lower surface of the upper end portion 3b of the rim 3.

The pair of guide plates 9b, 9c guide the movement of the upper end portion 3c of the rim 3 and the locking part 10 in the up and down direction, and the pair of guide plates 9b, 9c are formed so as to hold slidably the lower end portion 3c of the rim 3 and the locking part 10. The guide grooves 9b1, 9c1 extended along the up and down direction that is the longitudinal direction of the loose insert groove 9f are formed in the side end parts (the right side in FIG. 2) of the side plate 9e facing the guide plates 9b, 9c. The guide grooves 9b1, 9c1 hold movable pins 10c, 10d of the locking part 10 movable in the up and down direction, and the width of the groove is almost equal to or a little larger than the outer diameter of the movable pins 10c, 10d.

Tapered surfaces 9b2, 9c2 are formed on the facing surfaces of the guide plates 9b, 9c so that the space therebetween becomes narrower from the open side of the loose insert groove 9f (the left side in FIG. 2) toward the guide grooves 9b1, 9c1. Thereby, when the pair of movable pins 10c, 10d of the locking part 10 are inserted loosely into the loose insert groove 9f, the movable pins 10c, 10d side parts of a pair of stop pieces 10a, 10b can be elastically leaned toward their facing surfaces that is toward the arrows A and B by the tapered surfaces 9b2, 9c2.

The locking part 10 is extended from the lower end side 3c of the rim 3 toward the outer direction (the right side in FIG. 2) of the rim 3 and is formed in almost an U-shape seen from above. The locking part 10 is separated in two at its top end part and has a pair of stop pieces 10a, 10b. The pair of movable pins 10c, 10d of almost a cylindrical shape are provided on the top end parts (the right side in FIG. 2) of the pair of stop pieces 10a, 10b and each of the movable pins 10c, 10d is extended toward its non-facing surface side of the stop pieces 10a, 10b. The pair of movable pins 10c, 10d are formed so as to be inserted slidably into the pair of guide grooves 9b1, 9c1 of the locking part 9, and the pair of movable pins 10c, 10d are moved along the guide grooves 9b1, 9c1 when the locking part 10 moves along the loose insert groove 9f of the locking part 9.

Space W1 of almost an U-shape seen from above is formed between the facing surfaces of the pair of stop pieces 10a, 10b, and the pair of stop pieces 10a, 10b are formed so that their movable pins 10c, 10d side end parts can be elastically leaned into the inner direction (or the outer direction) of the locking part 10 that is the direction of arrows A and B in FIG. 2. The movable pins 10c, 10d can be easily inserted in the guide grooves 9b1, 9c1 of the locking part 9 respectively by elastically modifying the movable pins 10c, 10d end side parts of the pair of stop pieces 10a, 10b.

An elastic part 11 is formed by bending a plate body of an elastic material such as a metal material having elastic recovery force in a shape of "KU" in Japanese HIRAGANA that is a shape of boomerang shown from front, and a pair of plate parts 11a, 11b of almost a flat plate shape are formed via a bent part 11c. The elastic part 11 is a kind of a compression spring. The elastic part 11 is shrunk elastically via the bent part 11c by compressing the pair of plate parts 11a, 11b toward their facing surface sides, and the elastic part 11 generates elastic recovery force toward the non-facing surface sides of the pair of plate parts 11a, 11b by the shrinkage. The "compression spring" is a spring applying the elastic recovery force (or urging force) toward the direction opposite to its compressed direction that is an expanding direction of the compression spring.

The elastic part 11 is formed so as to be accommodated in the loose insert groove 9f of the locking part 9 (refer FIG. 1), and plate end parts 11a1, 11b1 that are bent in almost a "KU" shape of Japanese HIRAGANA that is a shape of boomerang toward the facing surface side of the plate parts 11a, 11bare formed on the side end part opposite to the bent part 11c side end of the plate parts 11a, 11b (the left side in FIG. 2)(refer FIG. 3). Therefore, as shown in FIG. 3, when the plate end part 11a1 of the elastic part 11 contacts the lower surface of the locking part 10, the lower surface of the locking part 10 is prevented to be damaged by the plate end part 11a1, thereby the damage of the locking part 10 can be prevented.

The elastic part 11 is formed by bending each of the plate end parts 11a1, 11b1. Therefore, even if the upper and lower position of the plate parts 11a, 11b of the elastic part 11 shown in FIG. 2 is switched and the plate end part 11b1 of the plate part 11b contacts the lower surface of the locking part 10, the damage of the locking part 10 can be prevented.

The elastic part 11 structured above is mounted between the bottom surface 9d of the locking part 9 and the lower surface of the locking part 10, as shown in FIG. 3. The plate part 11b of the elastic part 11 contacts the upper surface of the bottom plate 9d of the locking part 9 and the plate end part 11a1 of the plate part 11a contacts the lower surface of the locking part 10. The locking part 10 is urged upward that is toward the canopy plate 9a of the locking part 9 and contacts the canopy plate 9a and the upper surface of the lower end portion 3c of the rim 3 contacts the lower surface of the upper end portion 3a of the rim 3.

Because the open part of the loose insert groove 9f (the left side in FIG. 3) is covered with the lower end portion 3c of the rim 3, as shown in FIG. 3, the elastic part 11 that is provided between the lower surface of the locking part 10 and the bottom plate 9d of the locking part 9 can be prevented to be dropped out from the loose insert groove 9f without fixing the elastic part 11 into the loose insert groove 9f.

Next, the assembling method of the closing block 5 structured above is explained. First, the elastic part 11 is accommodated into the loose insert groove 9f of the locking part 9. The bent part 11c of the elastic part 11 is faced with the loose insert groove 9f of the locking part 9 and the elastic part 11 is inserted into the loose insert groove 9f, and the plate part 11b is placed on the bottom plate 9d of the locking part 9. The locking part 10 is loosely inserted into the loose insert groove 9f of the locking part 9.

When the locking part 10 is loosely inserted in the loose insert groove 9f, the end part of the locking part 10 that is the movable pins 10c, 10d side end part is inserted between the plate end part 11a1 of the elastic part 11 that is accommodated in the loose insert groove 9f and canopy plate 9a of the locking part 9. At this time, the movable pin 10c of the locking part 10 contacts the tapered surface 9b2 of the guide plate 9b and the movable pin 10d of the locking part 10 contacts the tapered surface 9c2 of the guide plate 9c. After the contact of the movable pins 10c, 10d, when the locking part 10 is further inserted into the loose insert groove 9f, the pair of stop pieces 10a, 10b are elastically leaned toward the inner direction. That is, the stop piece 1a is elastically leaned toward arrow A shown in FIG. 2, and the stop piece 10b is elastically leaned toward arrow B shown in FIG. 2.

According to the elastic deformation of the pair of stop pieces 10a, 10b, the space width between the movable pins 10c, 10d at the top end of the locking part 10 in their projected direction gradually becomes smaller. When the locking part 10 is further inserted into the loose insert groove 9f, the movable pins 10c, 10d reach the guide grooves 9b1, 9c1 of the guide plates 9b, 9c. When the movable pins 10c, 10d reach the guide grooves 9b1, 9c1, the pair of stop pieces 10a, 10b that are elastically deformed by the tapered surfaces 9b2, 9c2 are recovered toward the outer direction. That is, the stop piece 10a is recovered toward the opposite direction of the arrow A in FIG. 2, and the stop piece 10b is recovered toward the opposite direction of the arrow B in FIG. 2. By the recovery of the pair of stop pieces 10a, 10b, the movable pin 10c is inserted into the guide groove 9b1 and the movable pin 10d is inserted into the guide groove 9c1.

When the movable pins 10c, 10d are inserted into the guide grooves 9b1, 9c1, the open part of the loose insert groove 9f is covered with the lower end portion 3c of the rim 3 and the elastic part 11 is provided between the lower surface of the locking part 10 and the upper surface of the bottom plate 9d of the locking part 9, and the locking part 10 is urged toward the canopy plate 9a of the locking part 9 by the elastic part 11. By the urging force of the elastic part 11, the lower end portion 3c of the rim 3 is urged toward the upper end portion 3b of the rim 3 and the lower end portion 3c contacts the upper end portion 3b so that the cut 3a of the rim is closed. Thereby, the locking parts 9, 10 and the elastic part 11 are assembled together to assemble the closing block 5.

Next, the operation of the above-structured closing block 5 is explained. First, when the upper end portion 3b and the lower end portion 3c of the rim are held and the upper end portion 3b is pulled upward and the lower end portion 3c is pulled downward, the cut 3a of the rim 3 is open upward and downward and the open space becomes expanded. According to the expansion of the cut 3a, the locking part 10 is moved downward with the lower end portion 3c along the loose insert groove 9f. When the locking part 10 is moved downward along the loose insert groove 9f, the locking part 10 and the lower end portion 3c of the rim are moved and guided between the pair of guide plates 9b, 9c to the lower side of the loose insert groove 9f and the movable pins 10c, 10d of the locking part 10 are moved along the guide grooves 9b1, 9c1 toward the bottom plate 9d of the locking part 9.

When the locking part 10 is moved downward, the plate part 11a of the elastic part 11 is pressed on the lower surface of the locking part 10, and thereby the elastic part 11 is bent elastically via the bent part 11c and the elastic part 11 is compressed between the lower surface of the locking part 10 and the bottom plate 9d of the locking part 9. According to the compression of the elastic part 11, the inner shape of the rim 3 is expanded so that the lens 2 can be mounted into the rim 3. In this condition, the lens 2 is mounted into the rim 3 and when the rim 3 that has been pulled is released, the locking part 10 is urged upward by the elastic recovery force of the elastic part 11 and the lower end portion 3c of the rim 3 is moved to the upper end portion 3b. According to the upward movement of the lower end portion 3b, the inner shape of the rim 3 becomes smaller and the lower end portion 3c contacts the upper end portion 3b and the upper surface of the locking part 10 contacts the lower surface of the canopy plate 9a of the locking part 9, and therefore the lens 2 is fixed (held) certainly by the rim 3.

As explained above, in the closing block 5 of the frame 1 of the first preferred embodiment, the locking part 10 fixed to the lower end portion 3c of the rim is inserted loosely into the loose insert groove 9f of the locking part 9 fixed to the upper end portion 3b of the cut 3a of the rim 3, and the locking part 10 is urged toward the upper end portion 3b of the rim 3 by the elastic part 11 mounted between the bottom plate 9d of the locking part 9 and the locking part 10. Therefore, the lens 2 can be fixed certainly into the rim 3 by the elastic recovery force of the elastic part 11, even if the process precision of the outer shape of the lens 2 that is mounted into the rim 3 is worse.

The inner shape of the rim 3 is expanded by pulling out to open the cut 3a of the rim 3 and the inner shape of the rim 3 becomes smaller via the elastic part 11 by releasing and closing the cut 3a of the rim 3. Therefore, the lens 2 that is mounted into the rim 3 can be exchanged without using an exclusive screwdriver. Thus, a layman who is not a specialist of glasses, for example the user of the glasses can easily exchange the lens 2 to be mounted into the rim 3. For example, the user of the frame 1 can mount colored transparent lenses into the rims 3 to use the frame 1 as sunglasses, or the user can mount colorless transparent lenses for nearsightedness into the rims 3 to use the frame 1 as glasses for nearsightedness, or the user can mount polarizing lenses into the rims 3 to use the frame 1 as glasses for fishing.

Because the locking part 10 and the lower end portion 3c urged toward the upper end portion 3b side of the rim 3 by the elastic part 11 is held between the pair of guide plates 9b, 9c of the locking part 9 to be guided slidably to the upper end portion 3b of the rim 3, the locking part 10 urged by the elastic part 11 can be moved toward the upper end portion 3b of the rim without rattling. Therefore, when the cut 3a of the rim 3 is closed by the elastic recovery force of the elastic part 11, the mispositioning of the upper end portion 3b of the rim 3 and the lower end portion 3c of the rim 3 can be prevented so that the lenses 2 can be fixed certainly into the rims 3.

The movable pins 10c, 10d extended from the locking part 10 are inserted slidably along the movable direction (up and down direction in FIG. 2) of the locking part 10 into the guide grooves 9b1, 9c1 that are formed on the guide plates 9b, 9c. Therefore, when the locking part 10 and the lower end portion 3c of the rim 3 move between the pair of guide plates 9b, 9c, the locking part 10 can be prevented to be dropped out from the loose insert groove 9f of the locking part 9. It is prevented that the locking part 10 is dropped out from the loose insert groove 9f and the lens 2 is dropped out from the rim 3 during the use of the frame 1.

The moving position of the locking part 10 that is urged toward the upper end portion 3b of the rim 3 by the elastic recovery force of the elastic, part 11 is restricted by the canopy plate 9a of the locking part 9 and the moving position of the lower end portion 3c of the rim 3 is restricted by the upper end portion 3b of the rim 3. Therefore, when the lens 2 is removed from the rim 3, the locking part 10 is prevented to be dropped out to the upper direction from the loose insert groove 9f of the locking part 9 by the elastic recovery force of the elastic part 11. When the lens 2 is removed from the rim 3, the moving position of the locking part 10 and the lower end portion 3c of the rim 3 is restricted by the canopy plate 9a of the locking part 9 and the upper end portion 3b of the rim 3. Therefore, the inner shape of the rim 3 is prevented to become extremely smaller by the elastic recovery force of the elastic part 11 and the shape of the rim 3 is prevented to be deformed.

For example, in the frame where the both end portions of the cut of the rim is connected by an extension spring, the inner shape of the rim can be expanded or become smaller by the extension spring. However, in such a frame, if the inner shape of the rim is expanded too much, the extension spring is extremely extended to be plastically deformed and the extension spring is damaged. However, the elastic part 11 is comprised of a kind of a compression spring that generates elastic recovering force toward the direction opposite to the compressed direction (the non-facing surface side of the plate parts 11a, 11b) by compressing the pair of plate parts 11a, 11b toward their facing side direction. Therefore, the damage by the plastic deformation caused in the extension spring is hardly caused in the elastic part 11. The "extension spring" is a spring for applying the elastic recovering force (or the urging force) toward the direction opposite to its extending direction that is the shrinking direction of the extension spring.

Because the locking part 9 of the closing block 5 is fixed to the rear surface side of the clincher endpiece 6 as shown in FIG. 1, the closing block 5 can be mounted to the outer position from the outer corner of the eye of the user of the frame 1. Therefore, it is prevented that the closing block 5 obstructs the user's view when the user wears the frame 1. Because the closing block 5 is covered by the clincher endpiece 6, the appearance of the frame 1 can be maintained.

Figure 4:
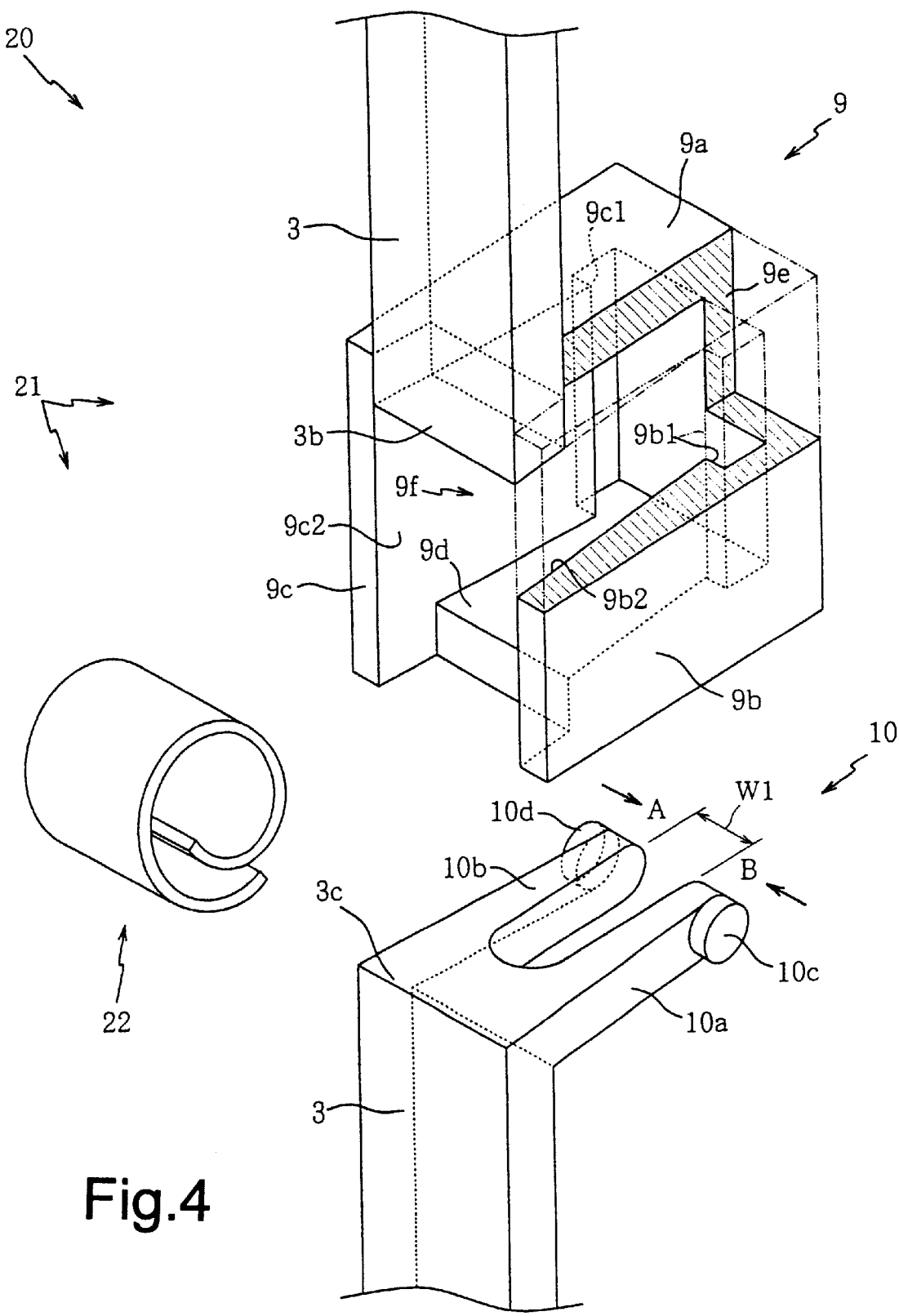
FIG. 4 is an exploded perspective view of the closing block used in the frame of the glasses of the second preferred embodiment.

Next, the closing block 21 used for a frame 20 of the second preferred embodiment is explained referring FIG. 4. FIG. 4 is an exploded perspective view of the closing block 21 used in the frame 20 of the second preferred embodiment and in the figure the locking part 9 is shown in a partial cross section and a part of the locking part 9 is shown by the two-dot chain line. As shown in FIG. 4, in the frame 20 of the second preferred embodiment, the closing block 5 is changed to the closing block 21 compared to the frame 1 of the first preferred embodiment. The same marks are applied to the same parts as the frame 1 of the first preferred embodiment and the explanation thereof is omitted and only different parts will be explained.

As shown in FIG. 4, in the closing block 21 of the frame 20 of the second preferred embodiment, an elastic part 22 is used for the elastic part 11 of the closing block 5 of the first preferred embodiment. The elastic part 22 is a kind of a spiral spring that is formed from a plate of an elastic material such as a metal material having elastic recovering force that is rolled up into a cylindrical shape of almost a C shape, and the elastic part 22 is formed so as to be accommodated into the loose insert groove 9f of the locking part 9. The upper end portion of the elastic part 22 contacts the lower surface of the locking part 10 and the lower end portion of the elastic part 22 is placed on the upper surface of the bottom plate 9d of the locking part 9. The elastic part 22 is a kind of a compression spring that urges the locking part 10 toward the upper end portion 3b of the rim 3.

In the closing block 21 used for the frame 20 of the second preferred embodiment, when the locking part 10 loosely inserted into the loose insert groove 9f is moved downward, the elastic part 22 is pressed by the lower surface of the locking part 10. By the pressure, the outer circumference of the elastic part 22 is shrunk and the inner shape of the rim 3 is expanded by the shrinkage of the elastic part 22, and the lens 2 can be inserted into the rim 3. In this condition, the lens 2 is inserted into the rim 3 and when the rim 3 that has been held is released, the outer circumference of the elastic part 22 is expanded by the elastic recovering force. Because the locking part 10 is urged toward the upper end portion 3b of the rim 3 by the expansion of the outer circumference of the elastic part 22, the lens 2 can be certainly fixed into the rim 3 even if the process precision of the outer shape of the lens 2 to be inserted to the rim 3 is worse.

Figure 5:
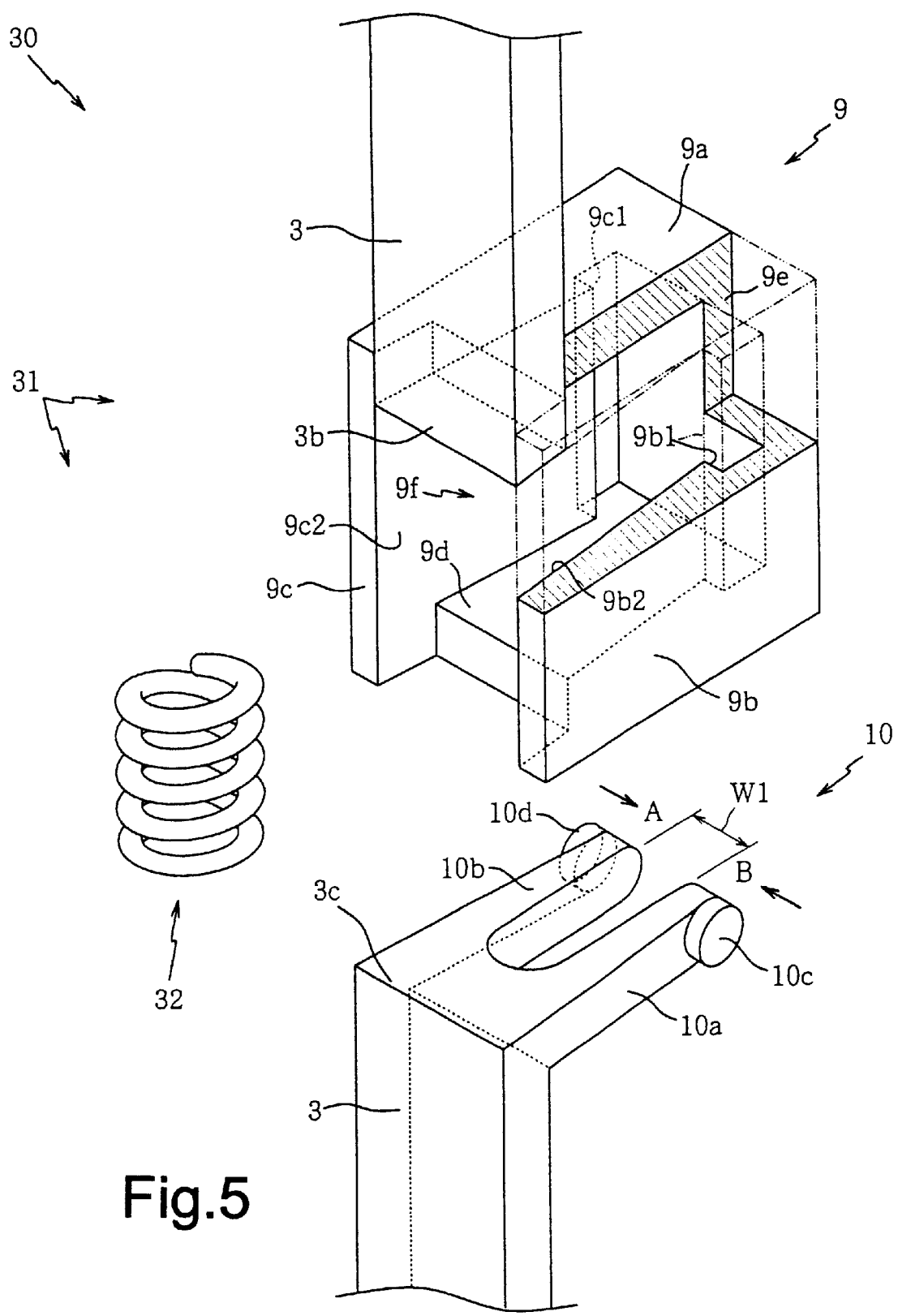
FIG. 5 is an exploded perspective view of the closing block used in the frame of the glasses of the third preferred embodiment.

Next, a closing block 31 used for a frame 30 of the third preferred embodiment is explained referring FIG. 5. FIG. 5 is an exploded perspective view of the closing block 31 used in the frame 30 of the third preferred embodiment and in the figure the locking part 9 is shown in a partial cross section and a part of the locking part 9 is shown by the two-dot chain line. As shown in FIG. 5, in the frame 30 of the third preferred embodiment, the closing block 5 is changed to the closing block 31 compared to the frame 1 of the first preferred embodiment. The same marks are applied to the same parts as the frame 1 of the first embodiment and the explanation thereof is omitted and only different parts will be explained.

As shown in FIG. 5, in the closing block 31 of the frame 30 of the third preferred embodiment, an elastic part 32 is used for the elastic part 11 of the closing block 5 of the first preferred embodiment. The elastic part 32 is a kind of a compression coil spring that is formed from a line material of an elastic material such as a metal material having elastic recovering force that is spirally rolled up into a cylindrical shape, and the elastic part 32 is formed so as to be accommodated into the loose insert groove 9f of the locking part 9. The upper end portion of the elastic part 32 contacts the lower surface of the locking part 10 and the lower end portion of the elastic part 32 is placed on the upper surface of the bottom plate 9d of the locking part 9. The elastic part 32 is a kind of a compression spring that urges the locking part 10 toward the upper end portion 3b of the rim 3.

In the closing block 31 used for the frame 30 of the third preferred embodiment, when the locking part 10 loosely inserted into the loose insert groove 9f is moved downward, the elastic part 32 is pressed by the lower surface of the locking part 10. By the pressure, the elastic part 32 is compressed and the inner shape of the rim 3 is expanded by the compression of the elastic part 32, and the lens 2 can be inserted into the rim 3. In this condition, the lens 2 is inserted into the rim 3 and when the rim 3 that has been held is released, the elastic part 32 is expanded by the elastic recovering force. Because the locking part 10 is urged toward the upper end portion 3b of the rim 3 by the recovery of the elastic part 32, the lens 2 can be certainly fixed into the rim 3 even if the process precision of the outer shape of the lens 2 to be inserted to the rim 3 is worse.

Figure 6:
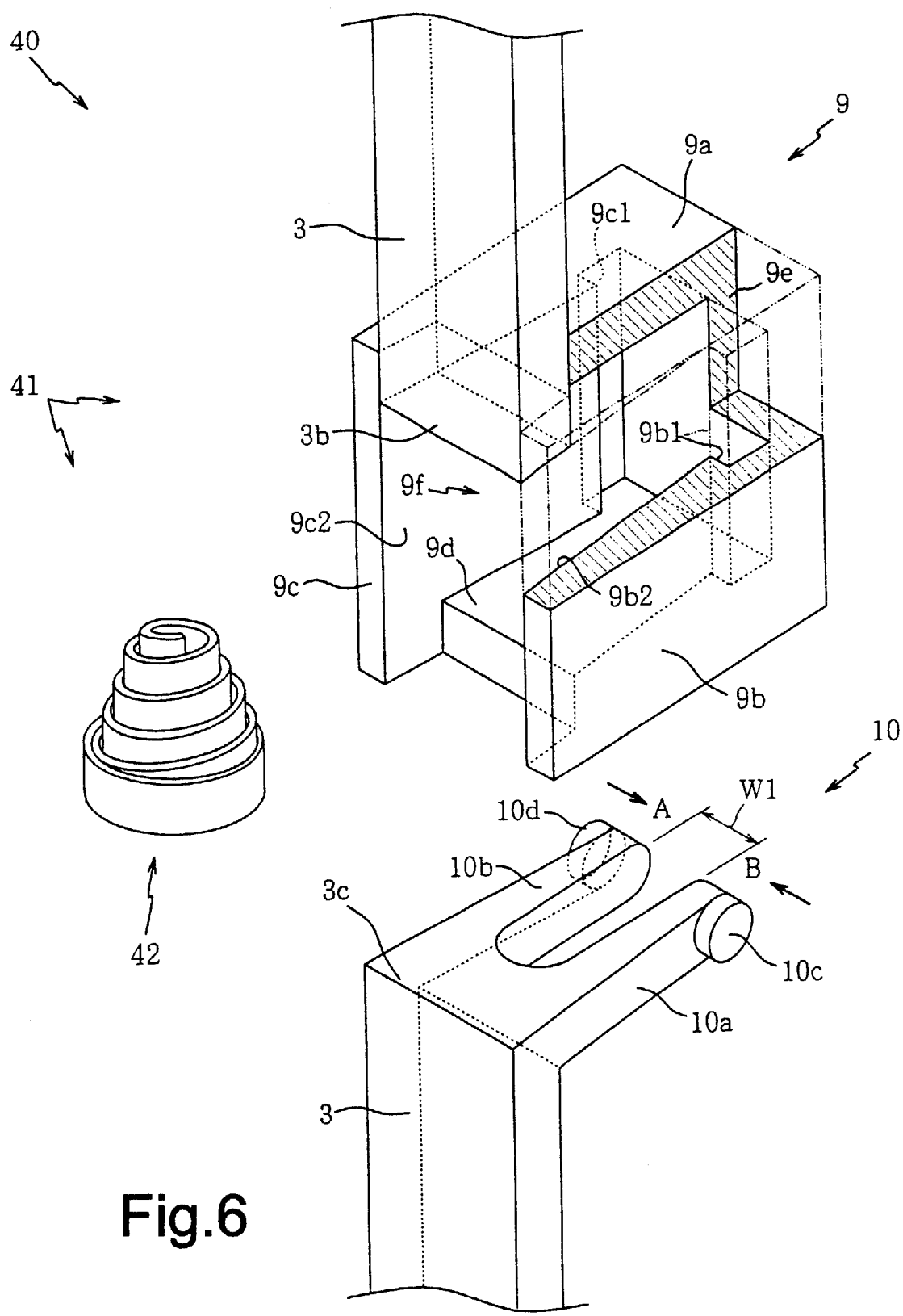
FIG. 6 is an exploded perspective view of the closing block used in the frame of the glasses of the fourth preferred embodiment.

Next, the closing block 41 used for a frame 40 of the fourth preferred embodiment is explained referring FIG. 6. FIG. 6 is an exploded perspective view of the closing block 41 used in the frame 40 of the fourth preferred embodiment and in the figure the locking part 9 is shown in a partial cross section and a part of the locking part 9 is shown by the two-dot chain line. As shown in FIG. 6, in the frame 40 of the fourth preferred embodiment, the closing block 5 is changed to the closing block 41 compared to the frame 1 of the first preferred embodiment. The same marks are applied to the same parts as the frame 1 of the first embodiment and the explanation thereof is omitted and only different parts will be explained.

As shown in FIG. 6, in the closing block 41 of the frame 40 of the fourth preferred embodiment, an elastic part 42 is used for the elastic part 11 of the closing block 5 of the first preferred embodiment. The elastic part 42 is a kind of a volute coil spring that is formed from a plate of an elastic material such as a metal material having elastic recovering force that is spirally rolled up into almost a conic shape, and the elastic part 42 is formed so as to be accommodated into the loose insert groove 9f of the locking part 9. The upper end portion of the elastic part 42 contacts the lower surface of the locking part 10 and the lower end portion of the elastic part 42 is placed on the upper surface of the bottom plate 9d of the locking part 9 and the elastic part 42 urges the locking part 10 toward the upper end portion 3b of the rim 3.

In the closing block 41 used for the frame 40 of the fourth preferred embodiment, when the locking part 10 loosely inserted into the loose insert groove 9f is moved downward, the elastic part 42 is pressed by the lower surface of the locking part 10. By the pressure, the elastic part 42 is compressed and the inner shape of the rim 3 is expanded by the compression of the elastic part 42, and the lens 2 can be inserted into the rim 3. In this condition, the lens 2 is inserted into the rim 3 and when the rim 3 that has been held is released, the elastic part 42 is expanded by the elastic recovering force. Because the locking part 10 is urged toward the upper end portion 3b of the rim 3 by the recovery of the elastic part 42, the lens 2 can be certainly fixed into the rim 3 even if the process precision of the outer shape of the lens 2 to be inserted to the rim 3 is worse.

Figure 7:
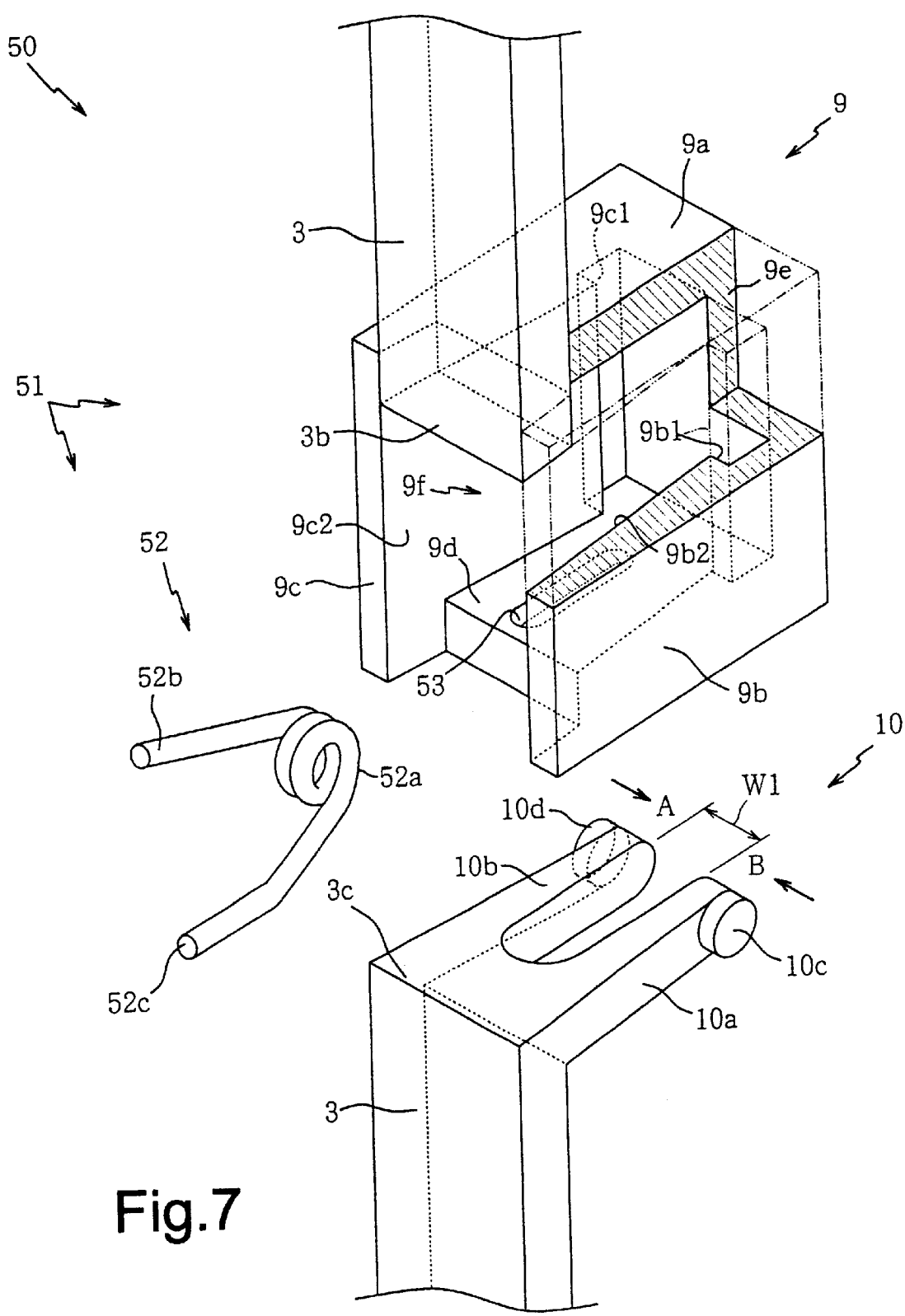
FIG. 7 is an exploded perspective view of the closing block used in the frame of the glasses of the fifth preferred embodiment.

Next, a closing block 51 used for a frame 50 of the fifth preferred embodiment is explained referring FIG. 7. FIG. 7 is an exploded perspective view of the closing block 51 used in the frame 50 of the fifth preferred embodiment and in the figure the locking part 9 is shown in a partial cross section and a part of the locking part 9 is shown by the two-dot chain line. As shown in FIG. 7, in the frame 50 of the fifth preferred embodiment, the closing block 5 is changed to the closing block 51 compared to the frame 1 of the first preferred embodiment. The same marks are applied to the same parts as the frame 1 of the first embodiment and the explanation thereof is omitted and only different parts will be explained.

As shown in FIG. 7, in the closing block 51 of the frame 50 of the fifth preferred embodiment, an elastic part 52 is used for the elastic part 11 of the closing block 5 of the first preferred embodiment. The elastic part 52 is comprised of a coil part 52a that is formed from a line material of an elastic material such as a metal material having elastic recovering force whose center part is spirally rolled up into a cylindrical shape, an upper arm part 52b extended diagonally upward from the coil part 52a and a lower arm part 52c extended diagonally downward from the coil part 52a, and the elastic part 52 is formed into almost a "KU" of Japanese HIRAGANA that is a shape of boomerang by the coil part 52a, the upper arm part 52b and the lower arm part 52c.

The elastic part 52 is a kind of a twisted coil spring and the elastic part 52 is formed so as to be accommodated into the loose insert groove 9f of the locking part 9. The end portion of the upper arm part 52b (the left upper side in FIG. 7) is fixed to the lower surface of the locking part 10 by solder and the lower arm part is placed on the bottom plate 9d of the locking part 9 and the elastic part 52 is a kind of a compression spring that urges the locking part 10 toward the upper end portion 3b of the rim 3. A stop groove 53 where an end portion of the lower arm part 52c (the left lower side in FIG. 7) of the elastic part 52 can be fit is formed on the upper surface of the bottom plate 9d of the locking part 9. The elastic part 52 is positioned in the loose insert groove 9f by fitting the lower arm part 52c of the elastic part 52 into the stop groove 53, therefore, it is prevented that the lower arm part 52c moves with rattling on the bottom plate 9d.

In the closing block 51 used for the frame 50 of the fifth preferred embodiment, when the locking part 10 loosely inserted into the loose insert groove 9f is moved downward, the upper arm part 52b of the elastic part 52 is pressed by the lower surface of the locking part 10 and the upper arm part 52b is elastically pressed and moved toward the lower arm part 52c via the coil part 52a. By the movement of the upper arm part 52b of the elastic part 52, the locking part 10 moves down in the loose insert groove 9f and the inner shape of the rim 3 is expanded, and the lens 2 can be inserted into the rim 3.

In this condition, the lens 2 is inserted into the rim 3 and when the rim 3 that has been held is released, the upper arm part 52b of the elastic part 52 urges the locking part 10 upward via the elastic recovering force of the coil part 52a and the lower end portion 3c of the rim 3 can be moved toward the upper end portion 3b by the urging force. Therefore, the lens 2 can be certainly fixed into the rim 3 even if the process precision of the outer shape of the lens 2 to be inserted to the rim 3 is worse.

Figure 8:
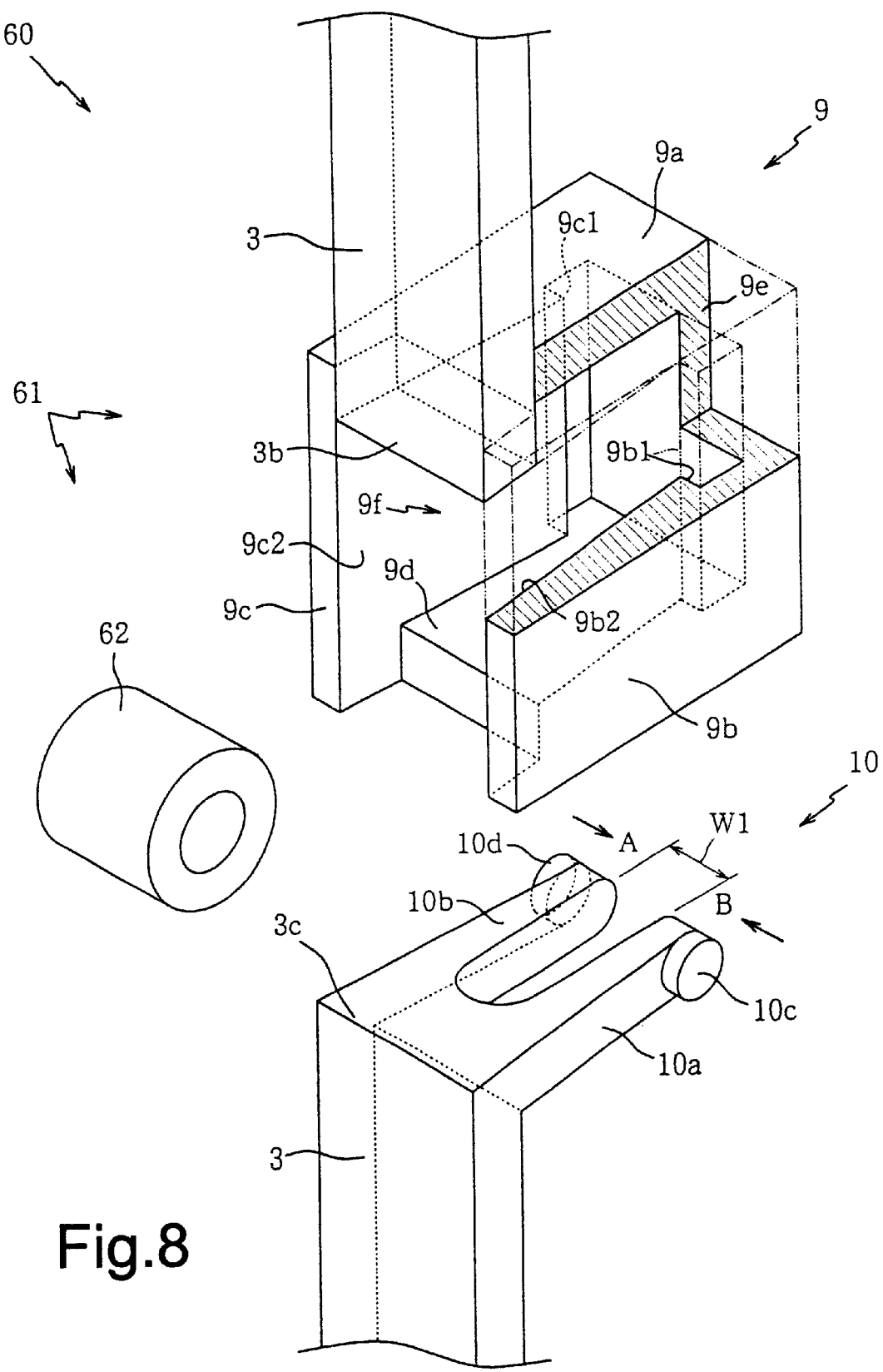
FIG. 8 is an exploded perspective view of the closing block used in the frame of the glasses of the sixth preferred embodiment.

Next, the closing block 61 used for a frame 60 of the sixth preferred embodiment is explained referring FIG. 8. FIG. 8 is an exploded perspective view of the closing block 61 used in the frame 60 of the sixth preferred embodiment and in the figure the locking part 9 is shown in a partial cross section and a part of the locking part 9 is shown by the two-dot chain line. As shown in FIG. 8, in the frame 60 of the sixth preferred embodiment, the closing block 5 is changed to the closing block 61 compared to the frame 1 of the first preferred embodiment. The same marks are applied to the same parts as the frame 1 of the first embodiment and the explanation thereof is omitted and only different parts will be explained.

As shown in FIG. 8, in the closing block 61 of the frame 60 of the sixth preferred embodiment, an elastic part 62 is used for the elastic part 11 of the closing block 5 of the first preferred embodiment. The elastic part 62 is a kind of a synthetic resin material (an elastic material) such as urethane, silicone rubber or EPDM(ethylene propylene dimethylene) having elastic recovering force that is formed in almost a cylindrical shape, and the elastic part 62 is formed so as to be accommodated into the loose insert groove 9f of the locking part 9. The upper end portion of the elastic part 62 contacts the lower surface of the locking part 10 and the lower end portion of the elastic part 62 is placed on the upper surface of the bottom plate 9d of the locking part 9 and the elastic part 62 urges the locking part 10 toward the upper end portion 3b of the rim 3.

In the closing block 61 used for the frame 60 of the sixth preferred embodiment, when the locking part 10 loosely inserted into the loose insert groove 9f is moved downward, the elastic part 62 is pressed by the lower surface of the locking part 10. By the pressure, the elastic part 62 is compressed and the inner shape of the rim 3 is expanded by the compression of the elastic part 62, and the lens 2 can be inserted into the rim 3. In this condition, the lens 2 is inserted into the rim 3 and when the rim 3 that has been held is released, the elastic part 62 is expanded by the elastic recovering force. Because the locking part 10 is urged toward the upper end portion 3b of the rim 3 by the recovery of the elastic part 62 and the lower end portion 3c of the rim 3 is moved toward the upper end portion 3b of the rim by the urging force, the lens 2 can be certainly fixed into the rim 3 even if the process precision of the outer shape of the lens 2 to be inserted to the rim 3 is worse.

Figure 9:
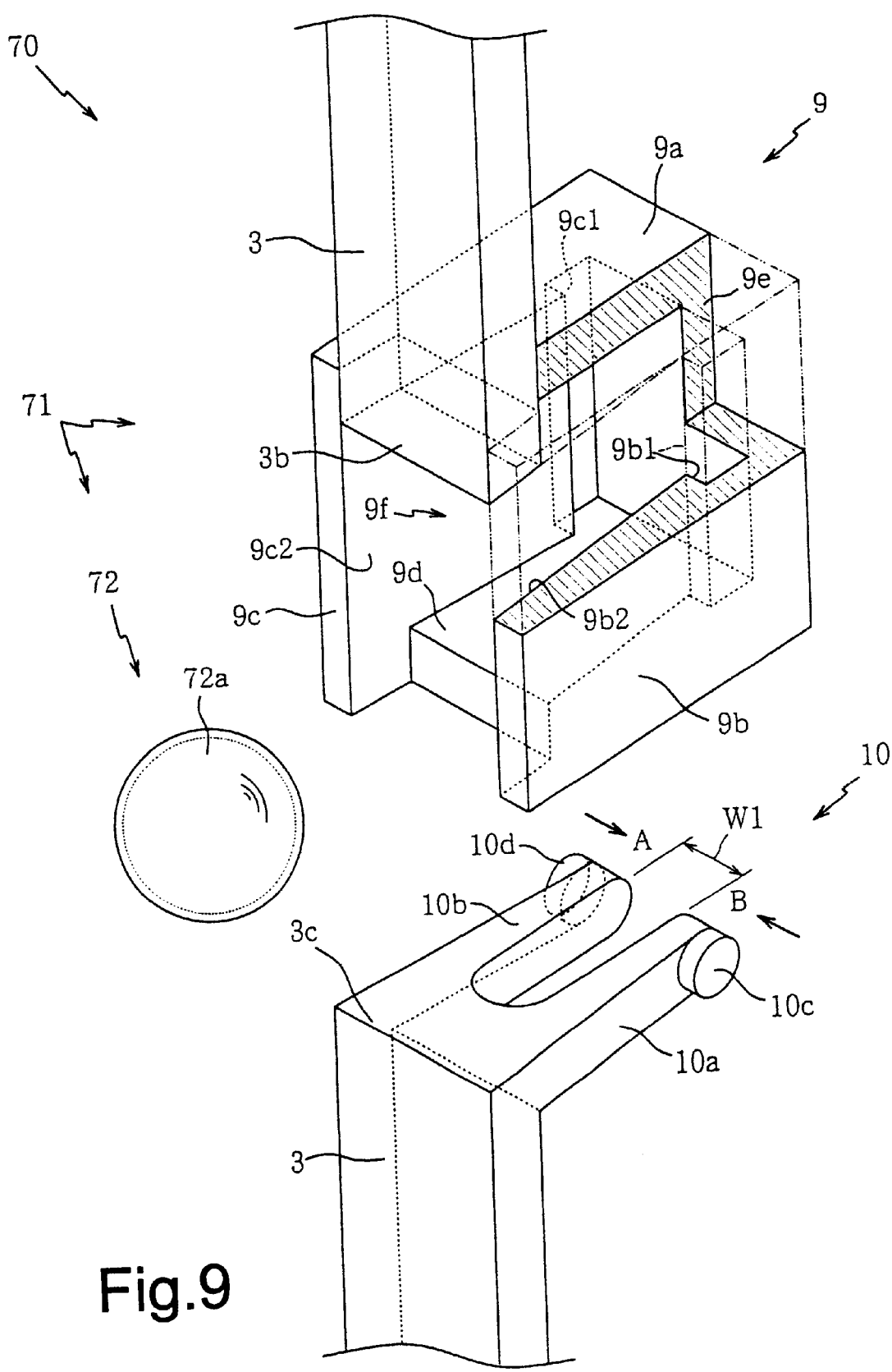
FIG. 9 is an exploded perspective view of the closing block used in the frame of the glasses of the seventh preferred embodiment.

Next, the closing block 71 used for a frame 70 of the seventh preferred embodiment is explained referring FIG. 9. FIG. 9 is an exploded perspective view of the closing block 71 used in the frame 70 of the seventh preferred embodiment and in the figure the locking part 9 is shown in a partial cross section and a part of the locking part 9 is shown by the two-dot chain line. As shown in FIG. 9, in the frame 70 of the seventh preferred embodiment, the closing block 5 is changed to the closing block 71 compared to the frame 1 of the first preferred embodiment. The same marks are applied to the same parts as the frame 1 of the first embodiment and the explanation thereof is omitted and only different parts will be explained.

As shown in FIG. 9, in the closing block 71 of the frame 70 of the seventh preferred embodiment, an elastic part 72 is used for the elastic part 11 of the closing block 5 of the first preferred embodiment. The elastic part 72 has a bag body 72a that is formed in a bag shape from a synthetic resin material such as a rubber material having elasticity, and gas such as air is forced into the bag body 72a so that the inner pressure of the bag body 72a becomes higher than the atmosphere pressure, and the elastic part 72 is formed so as to be accommodated into the loose insert groove 9f of the locking part 9. The upper end portion of the elastic part 72 contacts the lower surface of the locking part 10 and the lower end portion of the elastic part 72 is placed on the upper surface of the bottom plate 9d of the locking part 9 and the elastic part 72 urges the locking part 10 toward the upper end portion 3b of the rim 3.

In the closing block 71 used for the frame 70 of the seventh preferred embodiment, when the locking part 10 loosely inserted into the loose insert groove 9f is moved downward, the elastic part 72 is pressed by the lower surface of the locking part 10. By the pressure, the bag body 72a of the elastic part 72 is compressed and the inner shape of the rim 3 is expanded by the compression of the elastic part 72, and the lens 2 can be inserted into the rim 3.

In this condition, the lens 2 is inserted into the rim 3 and when the rim 3 that has been held is released, the elastic part 72 urges the locking part 10 upward by the elasticity of the bag body 72a and the elasticity of the gas forced into the bag body 72a. Because the locking part 10 is urged toward the upper end portion 3b of the rim 3 by the urging force of the elastic part 72, the lens 2 can be certainly fixed into the rim 3 even if the process precision of the outer shape of the lens 2 to be inserted to the rim 3 is worse. Moreover, the elastic part 72 can adjust its urging force for urging the locking part 10 by changing the pressure of the gas forced into the bag body 72a.

Figure 10:
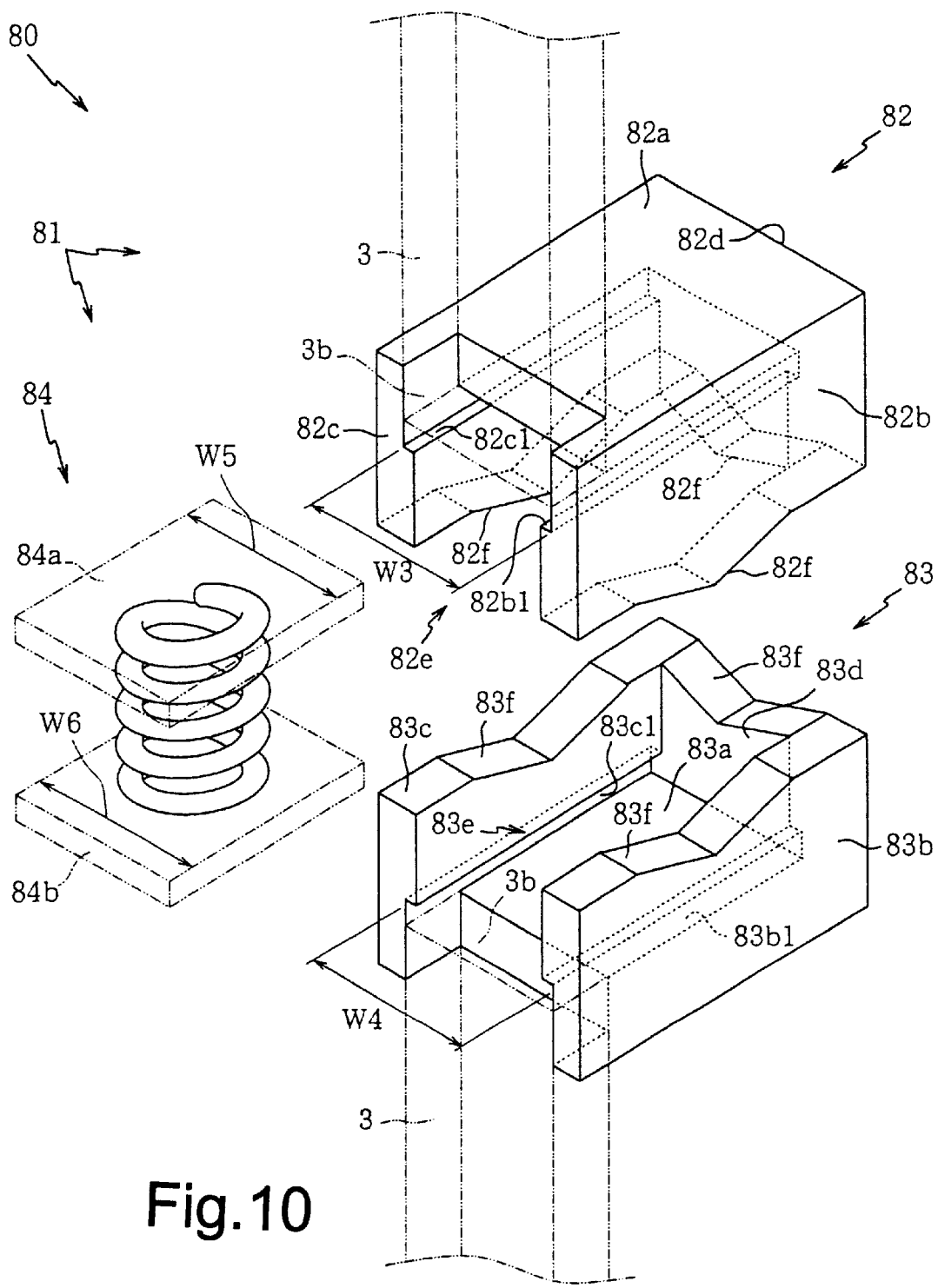
FIG. 10 is an exploded perspective view of the closing block used in the frame of the glasses of the eighth preferred embodiment.

Next, the closing block 81 used for a frame 80 of the eighth preferred embodiment is explained referring FIG. 10. FIG. 10 is an exploded perspective view of the closing block 81 used in the frame 80 of the seventh preferred embodiment and in the figure the locking part 9 is shown in a partial cross section and a part of the locking part 9 is shown by the two-dot chain line. As shown in FIG. 10, in the frame 80 of the eighth preferred embodiment, the closing block 5 is changed to the closing block 81 compared to the frame 1 of the first preferred embodiment. The same marks are applied to the same parts as the frame 1 of the first embodiment and the explanation thereof is omitted and only different parts will be explained.

As shown in FIG. 10, the closing block 81 of the frame 80 of the eighth preferred embodiment has a locking part 82 that is fixed to the upper end portion 3b of the rim 3 and formed in almost a rectangular parallelepiped shape, a locking part 83 that is fixed to the lower end portion 3c and formed in almost a rectangular parallelepiped, and an elastic part 84 urging the locking part 83 toward the locking part 82 and having elastic recovering force.

The locking part 82 has in its upper part a canopy plate 82a that is fixed to the upper end portion 3b of the rim 3 and formed of almost a plate shape, and guide plates 82b, 82c of a plate shape are extended downward from the both end sides of the canopy plates 82a (the both end sides of the front and rear direction in FIG. 10). Side wall plate 82d of almost a plate shape is formed extended from the three plates of the canopy plate 82a, the guide plates 82b, 82c and right to the guide plates 82b, 82c (the right side in FIG. 10), and the locking part 82 is formed in a rectangular parallelepiped whose left side surface (the left side in FIG. 10) and whose lower side surface are open by the four plates of the canopy plate 82a, the guide plates 82b, 82c and the side wall plate 82d so as to have an accommodation space 82e therein.

Insert grooves 82b1, 82c1 are formed parallel to the canopy plate 82a in the upper end parts of the facing surfaces of the pair of guide plates 82b, 82c from the open part in the left side surface of the locking part 82 to the side wall plate 82d side. A convex part of a V shape is formed on the lower end surface of the guide plates 82b, 82c where the insert grooves 82b1, 82c1 are formed and on the lower end surface of the side wall part 82d, that is on the lower end surface 82f of the locking part 82, and the lower end surface 82f is formed to correspond to the outer shape of the upper end surface 83f of the locking part 83.

The locking part 83 has on its lower part a bottom wall plate 83a of almost a plate shape that is fixed to the lower end portion 3c of the rim 3, and guide plates 83b, 83c of almost a plate shape are extended upward from the both end sides of the bottom wall plate 83a (the both end sides in the front and rear direction in FIG. 10). A side wall plate 83d of almost a plate shape is formed right to the three plates of the bottom side plate 83a, the guide plates 83b, 83c (the right side in FIG. 10). The locking part 83 is formed in a rectangular parallelepiped shape whose left side surface (the left side in FIG. 10) and whose upper side surface are open by the four plates of the bottom wall plate 83a, the guide plates 83b, 83c and the side wall plate 83d so as to have an accommodation space 83e. The accommodation space 83e communicates with the accommodation space 82e of the above-described locking part 82 and the accommodation space 82e, 83e accommodates the elastic part 84.

Insert grooves 83b1, 83c1 that are formed parallel to the bottom side plate 83a in the lower end parts of the facing surfaces of the pair of guide plates 83b, 83c from the open part in the left side surface of the locking part 83 to the side wall plate 83d side. A concave part of a V shape is formed on the upper end surface of the guide plates 83b, 83c where the insert grooves 83b1, 83c1 are formed and on the upper end surface of the side wall part 83d, that is on the upper end surface 83f of the locking part 83, and the upper end surface 83f is formed to correspond to the outer shape of the lower end surface 82f of the locking part 82. Therefore, when one of the locking parts 82, 83 is urged toward the another one of the locking parts 82, 83 by the elastic part 84, the position of the both locking parts 82, 83 can be determined by mating the upper end surface 83f of the locking part 83 with the lower end surface 82f of the locking part 82. Therefore, the mispositioning of the upper end portion 3b of the rim 3 and the lower end portion 3c of the rim 3 can be prevented and the lens 2 can be fixed into the rim 3 firmly.

The elastic part 84 is a kind of an extension coil spring that is formed in a cylindrical shape by spirally rolling up a line material of an elastic material such as a metal material having elastic recovering force. The upper part of the elastic part 84 is accommodated into the accommodation space 82e of the locking part 82 and the lower part of the elastic part 84 is accommodated into the accommodation space 83e. A pair of stop plates 84a, 84b formed from a metal material having rigidity in a rectangular flat plate are fixed horizontally to the both end portions in the up and down direction (the urging direction) of the elastic part 84 by solder.

The width W5 of the stop plate 84a is made a little smaller than the width W3 between the facing surfaces of the above-described insert grooves 82b1, 82c1 (W3>W5), and the plate thickness of the stop plate 84a is made a little smaller than the width of the insert grooves 82b1, 82c1 in the up and down direction (the up and down direction in FIG. 10). The width W6 of the stop plate 84b is made a little smaller than the width W4 between the facing surfaces of the above described insert grooves 83b1, 83c1 (W4>W6), and the plate thickness of the stop plate 84b is made a little smaller than the width of the insert grooves 83b1, 83c1 in the up and down direction (the up and down direction in FIG. 10). Therefore, the sop plate 84a can be stopped to the locking part 82 by inserting the stop plate 84a of the elastic part 84 into the locking part 82 along the insert grooves 82b1, 82c1, and the stop plate 84b can be stopped to the locking part 83 by inserting the stop plate 84b of the elastic part 84 into the locking part 83 along the insert grooves 83b1, 83c1.

Next, the operation of the above-structured closing block 81 is explained. First, when upper end portion 3b and lower end portion 3c of the rim 3 is held by hand and the upper end portion 3b is pulled upward and the lower end portion 3c is pulled downward, the elastic part 84 is extended and the locking part 83 is separated from the locking part 82. According to the extension of the elastic part 84, the inner shape of the rim 3 is expanded so that the lens 2 can be inserted to the rim 3. In this condition, the lens 2 is inserted into the rim 3 and when the rim 3 that has been held is released, one of the locking parts 82, 83 is urged toward the another one of the locking parts 82, 83 by the elastic recovering force of the elastic part 84, the lower end portion 3c of the rim 3 is moved toward the upper end portion 3b by the urging force. According to the upward movement of the lower end portion 3b, the inner shape of the rim gradually becomes smaller. Thereafter, the upper end surface 83f of the locking part 83 contacts and mates with the lower end surface 82f of the locking part 82, thereby the position of the both locking parts 82, 83 can be determined and the lens can be certainly fixed into the rim.

In the closing block 81 of the frame 80 of the eighth preferred embodiment, the elastic part 84 that urges one of the locking parts 82, 83 toward the another one of the locking parts 82, 83 is provided between the locking part 82 that is fixed to the upper end portion 3b of the rim 3 and the locking part 83 that is fixed to the lower end portion 3c of the rim 3. Therefore, the lens 2 can be certainly fixed into the rim 3 even if the process precision of the outer shape of the lens 2 to be inserted to the rim 3 is worse.

Because the inner shape of the rim 3 is expanded by pulling out the upper and lower end portions 3b, 3c of the rim 3 and the inner shape of the rim 3 is shrunk by releasing the upper and lower end portions 3b, 3c of the rim 3 to close them via the elastic part 84, the lens 2 that is to be inserted into the rim 3 can be exchanged without using an exclusive screwdriver.

The pair of stop plates 84a, 84b are fixed to the both upper and lower end portions of the elastic part 84 and the stop plate 84a is inserted to the insert grooves 82b1, 82c1 of the locking part 82 to be stopped and the stop plate 84b is inserted to the insert grooves 83b1, 83c1 to be stopped. When the elastic part 84 is installed between the locking part 82 and the locking part 83, it is not necessary that the both end portions of the elastic part 84 are fixed to (joined with) the locking parts 82, 83 by solder, therefore the installation of the elastic part 84 can become easy.

Because the accommodation space 82e, 83e are formed in the locking parts 82, 83 of the closing block 81 so as to be communicated with each other, the elastic part 84 can be accommodated in the accommodation space 82e, 83e. Because the elastic part 84 is accommodated in the accommodation space 82e, 83e of the locking parts 82, 83 and the elastic part 84 is covered within the closing block 81, the elastic part 84 is prevented to be exposed to the outward of the closing block 81 and the frame 80 can be maintained well.

Figure 11:
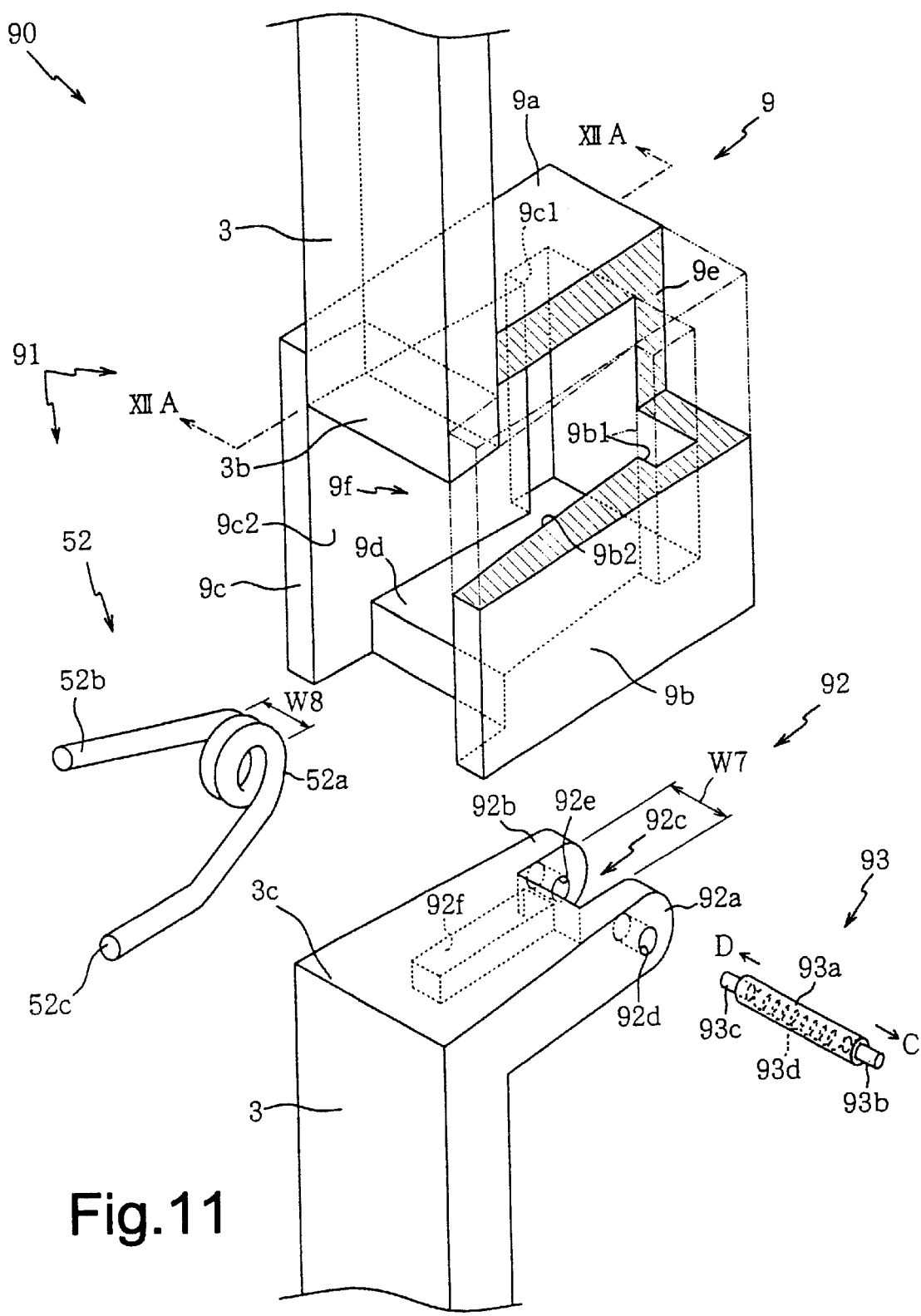
FIG. 11 is an exploded perspective view of the closing block used in the frame of the glasses of the ninth preferred embodiment.
Figure 12A:
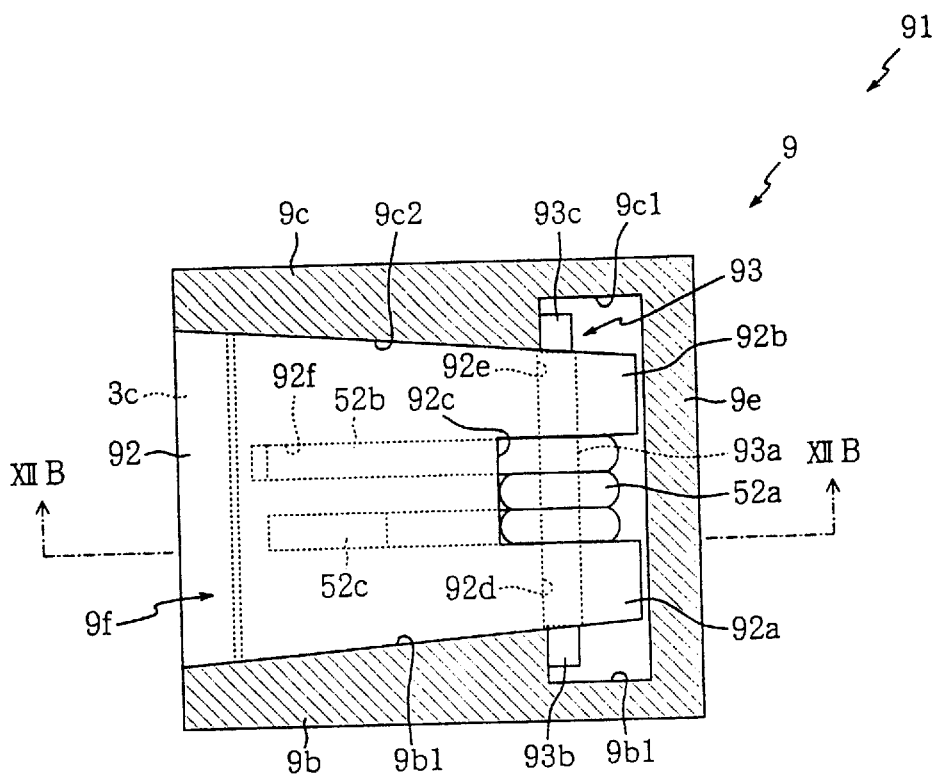
FIG. 12($a$) is a partial cross sectional view from the XIIA—XIIA line in FIG. 11 and a partial cross sectional view of the closing block wherein the locking part where the elastic part and support pin are mounted is inserted in the loose insert groove, and FIG. 12($b$) is a partial cross sectional view from the XIIB—XIIB line in FIG. 12($a$).
Figure 12B:
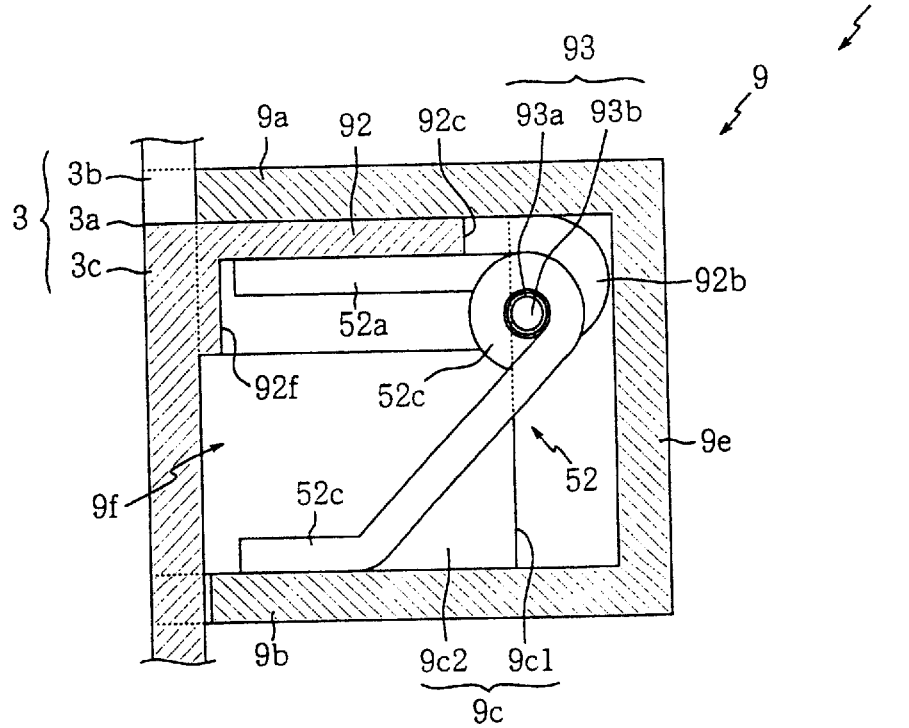

Next, a closing block 91 used for a frame 90 of the ninth preferred embodiment is explained referring FIGS. 11 and 12. FIG. 11 is an exploded perspective view of the closing block 91 used in the frame 90 of the ninth preferred embodiment and FIG. 12(a) is a partial cross sectional view from the XIIA—XIIA line in FIG. 11 and is a partial cross sectional view of the closing block 91 wherein the locking part 92 where the elastic part 52 and the support pin 93 are mounted is inserted in the loose insert groove 9f of the locking part 9, and FIG. 12(b) is a partial cross sectional view from the XIIB—XIIB line in FIG. 12(a). In FIG. 11, the locking part 9 is shown in a partial cross section and a part of the locking part 9 is shown by the two-dot chain line.

As shown in FIG. 11, in the frame 90 of the ninth preferred embodiment, the closing block is changed to the frames 1, 50 of the first and fifth preferred embodiments. The same marks are applied to the same parts as the frame 1, 50 of the first and fifth embodiments and the explanation thereof is omitted and only different parts will be explained.

As shown in FIG. 11, in the closing block 91 of the frame 90 of the ninth preferred embodiment, the closing block 91 is used for the closing blocks 5, 51 of the first and fifth embodiments. The closing block 91 has a locking part 92 that extends from the lower end portion 3c of the rim 3 to the outward of the rim 3 (the right side in FIG. 2) and the locking part 92 is formed in almost a U shape seen from the above. The locking part 92 has its top end portion separated into two parts that are a pair of stop pieces 92a, 92b, and an installation concave part 92c is formed between the pair of stop pieces 92a, 92b, wherein the coil part 52a of the elastic part 52 is accommodated and installed.

Communicating holes 92d, 92e are formed in the facing surfaces of the top ends (the right ends in FIG. 11) of the pair of stop pieces 92a, 92b respectively wherein the communicating holes 92d, 92e communicate in the width direction of the stop pieces 92a, 92b (the horizontal direction). A support pin 93 is inserted to the communicating holes 92d, 92e and the center of the communicating holes 92d, 92e are directed in the horizontal direction. When the support pin 93 is inserted to the pair of communicating holes 92d, 92e and the locking part 92 is loosely inserted to the loose insert groove 9f of the locking part 9, each of the end portions of the support pin 93 faces each of the pair of guide plates 9b, 9c of the locking part 9 respectively so that the support pin 93 is supported by the locking part 92. (referring FIG. 12(a))

The coil part 52a of the elastic part 52 is accommodated and installed in the installation concave part 92c, and the installation concave part 92c is formed in a concave shape seen from the above so as to open the top end side (the right side in FIG. 11) of the locking part 92. The width W7 of the installation concave part 92c that is a distance between the facing surfaces of the pair of stop pieces 92a, 92b is almost equal to or a little smaller than the width W8 of the coil part 52a of the elastic part 52. (W7≧W8) Therefore, the coil part 52a of the elastic part 52 can be installed into the installation concave part 92c by holding the coil part 52a. An accommodation groove 92f of an elongated groove is formed on the lower surface of the locking part 92 so that the lower part of the accommodation groove 92f is open.

As shown in FIG. 12(b), the accommodation groove 92f accommodates the upper arm portion 52b of the elastic part 52 and one end side in its longitudinal direction (the right side in FIG. 12(b)) communicates with the installation concave part 92c and the accommodation groove 92f is formed from the top end side (the right side in FIG. 12(b)) of the locking part 92 to the lower end portion 3c of the rim 3 (the left side of FIG. 12(b)). Because the position of the elastic part 52 where the coil part 52a is accommodated into the installation concave part 92c of the locking part 92 is determined under the locking part 92 by accommodating the upper arm portion 52b of the elastic part 52 in the accommodation groove 92f, it is prevented the elastic part 52 is moved with rattling in the loose insert groove 9f.

As shown In FIG. 11, the support pin 93 supports (installs) the elastic part 52 to the locking part 92 and guides the movement of the locking part 92 in the loose insert groove 9f. The support pin 93 comprises a main axis part 93a, a pair of movable pins 93b, 93c that are projected from the both end portions of the axis direction of the main axis part 93a to outside, and a spring part 93d that is installed in the main axis part 93a and urges the pair of movable pins 93b, 93c in the outer directions (the directions of the arrows C, D in FIG. 11) of the axis direction of the main axis part 93a.

The main axis part 93a of the support pin 93 is formed so as to be inserted to the communicating holes 92d, 92e of the locking part 92, as shown in FIG. 12(a) and formed so as to be inserted to the internal circumference part of the coil part 52a of the elastic part 52. The pair of movable pins 93b, 93c are formed to be slidably inserted into the pair of guide grooves 9b1, 9c1 of the locking part 9 and the locking part 92 can slidably move in the guide grooves 9b1, 9c1 when the locking part 92 moves in the loose insert groove 9f of the locking part 9.(referring FIG. 12(b))

Next, the assembling method of the above-structured closing block 91 is explained. First, the coil part 52a of the elastic part 52 is put in the installation concave part 92c of the locking part 92 and the upper part 52a of the elastic part 52 is put in the accommodation groove 92f of the locking part 92. Thereafter, when the main axis part 93a of the support pin 93 is inserted to the communicating hole 92d (or the communicating hole 92e) of the locking part 92 and the internal circumference part of the coil part 52a of the elastic part 52 and the communicating hole 92e (or the communicating hole 92d), the elastic part 52 is installed to the locking part 92 via the support pin 93. After the installation of the elastic part 52, the locking part 92 is loosely inserted to the loose insert groove 9f of the locking part 9.

For inserting loosely the locking part 92 into the loose insert groove 9f, when the top end portion of the locking part 92 that is the end portion of the support pin 93 inserting side is inserted to the loose insert groove 9f, the movable pin 93b of the support pin 93 contacts the tapered surface 9b2 of the guide plate 9b and the movable pin 93c of the support pin 93 contacts the tapered surface 9c2 of the guide plate 9c. After the contact of the movable pins 93b, 93c, when the locking part 92 is further inserted into the loose insert groove 9f, the pair of movable pins 93b, 93c are pushed into the inner direction of the main axis part 93a via the tapered surfaces 9b2, 9c2, that is, the movable pin 93b is pushed into the opposite direction of the arrow C in FIG. 11 and the movable pin 93c is pushed into the opposite direction of the arrow D in FIG. 11.

According to the push of the pair of movable pins 93b, 93c, the length of the support pin 93 in its axis direction gradually becomes smaller, and when the locking part 92 is further inserted into the loose insert groove 9f, the movable pins 93b, 93c reach the guide grooves 9b1, 9c1 of the guide plates 9b, 9c. When the movable pins 93b, 93c reach the guide grooves 9b1, 9c1, the pair of movable pins 93b, 93c that are pushed into the main axis part 93a by the tapered surfaces 9b2, 9c2 become urged and recovered by the spring part 93d toward the outside of the main axis part 93a, that is, the movable pin 93b become urged and recovered in the direction of the arrow C in FIG. 11 and the movable pin 93c become urged and recovered in the direction of the arrow D in FIG. 11. By the recovery of the pair of movable pins 93b, 93c, the movable pin 93b is inserted to the guide groove 9b1 and the movable pin 93c is inserted to the guide groove 9c1.

When the movable pins 93b, 93c are inserted to the guide grooves 9b1, 9c1, the open part of the loose insert groove 9f is covered with the lower end portion 3c of the rim 3 and the elastic part 52 is mounted between the lower surface of the locking part 92 and the upper surface of the bottom wall plate 9d of the locking part 9. The locking part 92 is urged toward the canopy plate 9a of the locking part 9 by the elastic part 52. The lower end portion 3c of the rim 3 is urged toward the upper end portion 3b of the rim 3 by the urging force of the elastic part 52 so that the lower end portion 3c contacts the upper end portion 3b. Thus, the locking parts 9, 92 and the elastic part 52 are assembled and the closing block 5 is assembled.

In the closing block 91 used for the frame 90 of the ninth preferred embodiment, when the upper end portion 3b and the lower end portion 3c of the rim 3 are held by hand and the upper end portion 3b is pulled upward and the lower end portion 3c is pulled downward, the locking part 92 is moved downward in the loose insert groove 9f with the lower end portion 3c of the rim 3. When the locking part 92 is moved downward in the loose insert groove 9f, the locking part 92 and the lower end portion 3c of the rim 3 are guided to the lower part of the loose insert groove 9f between the pair of guide plates 9b, 9c and the movable pins 93b, 93c of the support pin 93 that is installed to the locking part 92 are moved toward the bottom wall plate 9d of the locking part 9 along the guide grooves 9b1, 9c1.

When the locking part 92 is moved downward, the upper arm part 52b of the elastic part 52 that is accommodated in the accommodation groove 92f of the locking part 92 is pressured, the upper arm part 52b is elastically pressed to be moved toward the lower arm part 52c via the coil part 52a. According to the movement of the upper arm part 52b of the elastic part 52, the locking part 92 moves down in the loose insert groove 9f and the inner shape of the rim 3 is expanded so that the lens 2 can be inserted into the rim 3.

In this condition, the lens 2 is inserted into the rim 3 and when the rim 3 that has been held is released, the upper arm part 52b of the elastic part 52 urges the locking part 10 upward via the elastic recovering force of the coil part 52a and the lower end portion 3c of the rim 3 is moved toward the upper end portion 3b by the urging force. Therefore, the lens 2 can be certainly fixed into the rim 3 even if the process precision of the outer shape of the lens 2 to be inserted to the rim 3 is worse.

Moreover, in the closing block 91 of the ninth preferred embodiment, because the elastic part 52 is installed to the locking part 92 via the support pin 93, the elastic part 52 can be inserted into the loose insert groove 9f and installed between the locking parts 9, 92 when the locking part 92 is loosely inserted into the loose insert groove 9f of the locking part 9. Therefore, when the closing block 91 is assembled, it is not necessary that the installing operation of the elastic part 52 to the loose insert groove 9f and the inserting operation of the locking part 92 into the loose insert groove 9f are made separately and the assembling operation of the closing block 91 can be made simple.

Figure 13A:
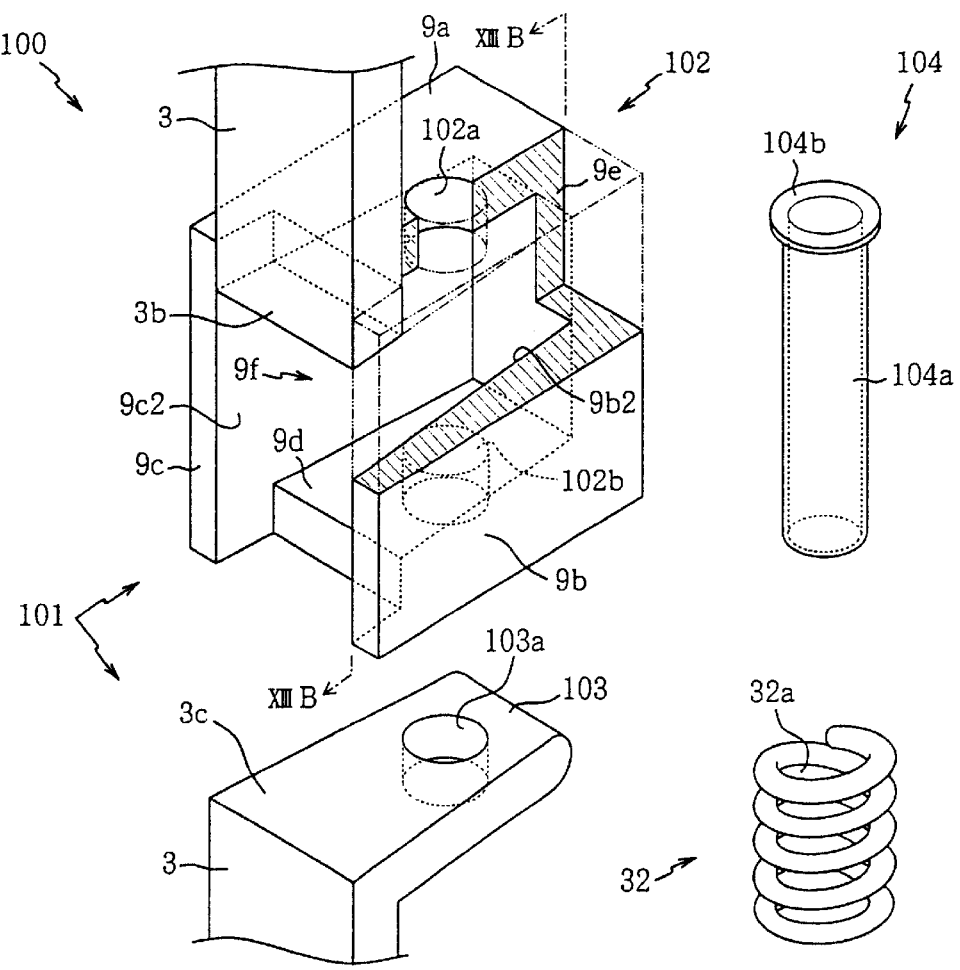
FIG. 13($a$) is an exploded perspective view of the closing block used in the frame of the glasses of the tenth preferred embodiment, and FIG. 13($b$) is a partial cross sectional view from the XIIIB—XIIIB line in FIG. 13($a$) and is a partial cross sectional view of the closing block during its assembly.
Figure 13B:
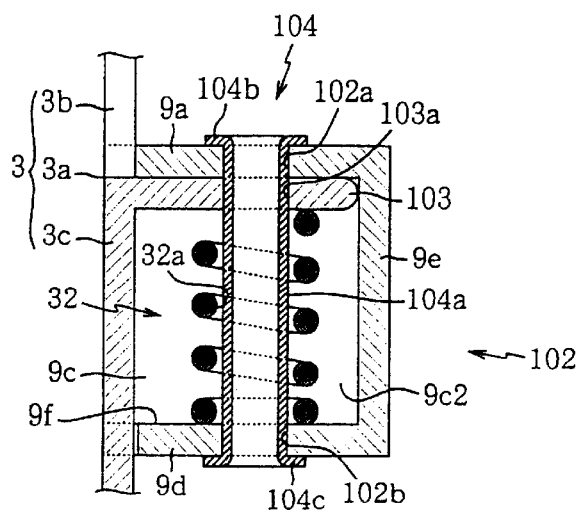

Next, a closing block 101 used for a frame 100 of the tenth preferred embodiment referring FIG. 13. FIG. 13(a) is an exploded perspective view of the closing block 101 used in the frame 100 of the tenth preferred embodiment, and FIG. 13(b) is a partial cross sectional view from the XIIIB—XIIIB line in FIG. 13(a) and is a partial cross sectional view of the closing block 101 during its assembly. In FIG. 13(a), a locking part 102 is shown in a partial cross section and a part of the locking part 102 is shown by the two-dot chain line.

As shown in FIG. 13(a), in the frame 100 of the tenth preferred embodiment, a pair of locking parts are changed to the frames 1, 30 of the first and third preferred embodiments. The same marks are applied to the same parts as the frame 1, 30 of the first and third embodiments and the explanation thereof is omitted and only different parts will be explained.

The closing block 101 comprises a locking part 102 that is formed in almost a rectangular shape and fixed to the upper end portion 3b of the rim 31 a locking part 103 provided to the lower end portion 3c of the rim 3, an elastic part 32 having elastic recovering force and urging the locking part 103 upward that is toward the upper end portion 3b of the rim 3, and a guide pin 104 guiding the movement of the locking part 103 urged by the elastic part 32.

A communicating hole 102a of an elliptic shape is formed in the center part of the canopy plate of the locking part 102 so as to penetrate from the upper surface to the lower surface of the canopy plate 9a, and a communicating hole 102b of an elliptic shape is formed in the center part of the bottom wall plate 9d so as to-penetrate from the upper surface to the lower surface of the bottom wall plate 9d. A cylindrical part 104a of the guide pin 104 is inserted into the communicating holes 102a, 102b and the inside diameter of the communicating holes 102a, 102b is a little larger than (or approximately equal to) the outside diameter of the cylindrical part 104a of the guide pin 104. (referring FIG. 13(b)) The communicating holes 102a, 102b are formed corresponding with each other and the center of the holes 102a, 102b is positioned on the same line in the perpendicular direction of the locking part 102 (the up and down direction in FIG. 13(a)).

The guide grooves 9b1, 9c1 that are formed in the locking part 9 in the first and third embodiments are not formed in the pair of guide plates 9b, 9c of the locking part 102. The facing surfaces of the pair of guide plates 9b, 9c of the locking part 102, that are the tapered surfaces 9b2, 9c2 are formed in a flat surface from the open side of the loose insert groove 9f (the left side in FIG. 13(a)) to the connecting part with the side wall plate 9e (the right side in FIG. 13(a)).

The locking part 103 is extended from the lower end surface 3c of the rim 3 to outward of the rim 3 (the right side in FIGS. 13(a) and 13b)) and the locking part 103 is formed in almost a rectangular shape. An insert groove 103a of almost a circular shape is formed in the center of the upper surface of the locking part 103 so as to penetrate from its upper surface to its lower surface. The cylindrical part 104a of the guide pin 104 is movably inserted into the insert hole 103a and the inside diameter of the insert hole 103a is formed a little larger than (or almost equal to) the outside diameter of the cylindrical part 104a. Therefore, when the locking part 103 moves in the loose insert groove 9f of the locking part 102, the cylindrical part 104a of the guide pin 104 relatively moves in the insert hole 103a to guide the movement of the locking part 103.

The guide pin 104 guides the movement of the locking part 103 and the guide pin 104 is for example formed from a metal material having rigidity. The guide pin 104 has the cylindrical part 104a of almost a cylindrical shape and the outside diameter of the cylindrical part 104a is formed a little smaller than (or almost equal to) the inside diameter of the communicating holes 102a, 102b of the locking part 102 and formed smaller than the inside diameter of an internal circumference part 32a of the elastic part 32 (referring FIG. 13(b)).

A flange 104b of a disc of almost an O shape seen from the above is formed around the outer circumference of one end side of the cylindrical part 104a (the upper end side in FIG. 13(a)). The flange 104b is hooked to the upper surface of the canopy plate 9a of the locking part 102 to fix the guide pin 104 and the flange 104b is formed extending from one end side of the cylindrical part 104a to the direction of the outer circumference (the direction of the radius) of the cylindrical part 104a.

The length of the cylindrical part 104a in its axis direction (the up and down direction in FIG. 13(a)) is formed longer than the length from the upper surface of the canopy plate 9a of the locking part 102 to the lower surface of the bottom wall plate 9d. The top end (the lower side end in FIG. 13(a)) of the cylindrical part 104a that is inserted to the communicating hole 102a of the locking part 102 penetrates through the communicating hole 102b and the top end of the cylindrical part 104a is projected from the lower surface of the bottom wall plate 9d. The projected part is caulked so that a flange 104c is formed on the guide pin 104, as shown in FIG. 13(b).

As shown in FIG. 13(b), the flange 104c is formed around the outer circumference of the other end side (the lower end side in FIG. 13(b)) of the cylindrical part 104a of the guide pin 104 and formed in almost same shape of the flange 104b that is a disc of almost an 0 shape seen from the above. The flange 104c is hooked to the lower surface of the bottom wall plate 9d of the locking part 102 to fix the guide pin 104 and the flange 104c is projected to the direction of outer circumference (the direction of radius) of the cylindrical part 104a. The flange 104c is formed by caulking the other end side of the guide pin 104 by a tool such as a drift.

The cylindrical part 104a of the guide pin 104 is provided in the loose insert groove 9f of the locking part 102 and the cylindrical part 104a is provided from the bottom wall plate 9d side end of the loose insert groove 9f to its canopy plate 9a side end that is in the same direction of the urging direction of the elastic part 32 (the upward direction in FIG. 13(b)). The cylindrical part 104a is inserted into and penetrated through the insert hole 103a formed in the locking part 103 so as to guide the locking part 103 along the urging direction of the elastic part 32 (the up and down direction in FIG. 13(b)). Therefore, the locking part 103 that is urged by the elastic part 32 can be moved toward the upper end portion 3b of the rim 3 without rattling. When the cut 3a of the rim 3 is closed by the elastic recovery force of the elastic part 32, the mispositioning of the upper end portion 3b and the lower portion 3c of the rim 3 can be prevented and the lens 2 can be certainly fixed to the rim 3.

The elastic part 32 is formed so as to be accommodated into the loose insert groove 9f of the locking part 102 and the upper end portion of the elastic part 32 contacts the lower surface of the locking part 103 and its lower end portion is placed on the bottom wall plate 9d of the locking part 102. The cylindrical part 104a of the guide pin 104 is inserted to the inner circumference part 32a of the elastic part 32 and the elastic part 32 is fixed (positioned) in the loose insert groove 9f of the locking part 102 by the insertion of the cylindrical part 104a. The fixing by the guide pin 104 prevents the elastic part 32 from dropping out from the loose insert groove 9f.

Next, the assembling method of the above-structured closing bloke 101 is explained. First, the elastic part 32 is accommodated into the loose insert groove 9f of the locking part 102 and placed on the bottom wall plate 9d. Thereafter, the top and of the locking part 103 (the right side end in FIG. 13(a)) is loosely inserted between the upper end (the upper side end in FIG. 13(b)) of the elastic part 32 that is accommodated in the loose insert groove 9f and the lower surface of the canopy plate 9a of the locking part 102. At this time, the locking part 103 contacts the tapered surface 9b2 of the guide plate 9b and the tapered surface 9c2 of the guide plate 9c so as to be guided to the wall side plate 9e side of the loose insert groove 9f that is the inner part of the loose insert groove 9f (the right side in FIGS. 13(a) and 13(b)).

When the loose insertion of the locking part 103 is completed, the open part of the loose insert groove 9f is covered with the lower end portion 3c of the rim 3 and the elastic part 32 is installed between the lower surface of the locking part 103 and the upper surface of the bottom wall 9d of the locking part 102. Thereafter, the cylindrical part 104a of the guide pin 104 of the condition shown in FIG. 13(a)

wherein the flange 104c is not formed is inserted into the communicating hole 102a of the locking part 102 and inserted into the insert hole 103a of the locking part 103. After the insertion, when the cylindrical part 14a is further inserted, the cylindrical part 104a is inserted to the inner circumference part 32a of the elastic part 32 and penetrates through the communicating hole 102b and the end of the cylindrical part 104a (the lower side end in FIG. 13(b)) is projected from the lower surface of the bottom wall plate 9d. Thereafter, the projected part of the cylindrical part 104a is caulked by a tool such as a drift to form the flange 104c.

By the formation of the flange 104c, the flange 104c is hooked to the lower surface of the bottom wall plate 9d of the locking part 102 and the flange 104b is hooked to the upper surface of the canopy plate 9a of the locking part 102, and the guide pin 104 is fixed by the locking part 102 and the assembly of the closing block 101 is completed.

In the closing block 101 of the frame 100 of the tenth preferred embodiment, when the locking part 103 moves downward in the loose insert groove 9f, the cylindrical part 104a that is inserted into the insert hole 103a of the locking part 103 is relatively moved in the insert hole 103a so that the locking part 103 is moved and guided to the lower side of the loose insert groove 9f. When the locking part 103 is moved, the elastic part 32 is pressed by the lower surface of the locking part 103. By the pressure the elastic part 32 is compressed and the inner shape of the rim 3 is expanded by the compression so that the lens 2 can be inserted into the rim 3. In this condition, the lens 2 is inserted into the rim 3 and when the rim 3 that has been held is released, the elastic part 32 is expanded and recovered by the elastic recovering force. Because the locking part 103 is urged toward the upper end portion 3b of the rim 3 by the recovery of the elastic part 32, the lens 2 can be certainly fixed into the rim 3 even if the process precision of the outer shape of the lens 2 to be inserted is worse.

Moreover, because the cylindrical part 104a of the guide pin 104 that is provided in the loose insert groove 9f of the locking part 102 is inserted into the insert hole 103a formed in the locking part 103, it is prevented that the locking part 103 is dropped out from the loose insert groove 9f of the locking part 102. Therefore, it can be prevented that the locking part 103 is dropped out from the loose insert groove 9f of the locking part 102 during the use of the frame 100 and the lens 2 is dropped out of the rim 3.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

For example, in the first to seventh preferred embodiments, in the ninth and tenth preferred embodiments, the first locking part 9, 102 is fixed to the upper end portion 3a of the rim 3 and the second locking part 10, 103 that is provided to the lower end portion 3b of the rim 3 is loosely inserted to the loose insert groove 9f of the first locking part 9, 102, however, the position of the first and second locking parts is not limited thereto. For example, the first locking part having the loose insert groove can be fixed to the lower end portion of the rim and the second locking part that is loosely inserted to the loose insert groove of the first locking part can be provided to the upper end portion of the rim. Thus, the closing block can be structured so that the second locking part is loosely inserted to the first locking part.

The pair of guide plates 9b, 9c of the first locking part 9, 102 are provided so as to hold the second locking part 10, 103 and the lower end portion 3b of the rim 3, however, the pair of guide plates does not necessarily hold and guide the both of the second locking part and the lower end portion of the rim. For example, the pair of guide plates can hold and guide at least one of the second locking part or the lower end portion of the rim.

In the first to tenth preferred embodiments, a metal frame of a metal material is used for the frame 1, 20, 30, 40, 50, 60, 70, 80, 90, 100, however, the frame is not necessarily formed from the metal frame, and for example the frame can be formed from a combination frame or a plastic frame.

The installation position of the closing block 5, 21, 31, 41, 51, 61, 71, 81, 91, 101 is not necessarily in the part of clincher endpiece 6 as explained in the above preferred embodiments, the closing block can be provided to the connecting part of the rim 3 and the bridge 4. When the closing block is provided to the connecting part of the rim 3 and the bridge 4, the closing block can be positioned in the upper part of the user's nose. Therefore, it can be prevented that the closing block obstructs the user's view when the user wears the frame. The appearance of the frame can be maintained by covering the closing block with the bridge.

In the fifth preferred embodiment, the upper arm part 52b of the elastic part 52 is fixed to the lower surface of the locking part 10 and the lower arm part 52c of the elastic part 52 is inserted into the stop groove 53 that is formed on the upper surface of the bottom wall plate 9d of the locking part 9, so that the elastic part 52 is provided in the loose insert groove 9f of the locking part 9. However, the installation method of the elastic part 52 is not limited thereto, for example a stop groove for receiving the upper arm part 52b of the elastic part 52 can be formed on the lower surface of the locking part 10 and the upper arm part 52b of the elastic part 52 can be inserted to the stop groove, and the lower arm part 52c of the elastic part 52 can be fixed by solder to the upper surface of the bottom wall plate 9d of the locking part 9.

In the sixth preferred embodiment, the elastic part 62 is formed in almost a cylindrical shape from an elastic material such as synthetic resin material having elastic recovering force. However, the shape of the elastic part 62 is not limited thereto, and the shape of the elastic part 62 can be a rectangular shape or a spherical shape if the elastic part 62 can be accommodated into the loose insert groove 9f of the locking part 9.

In the seventh preferred embodiment, the elastic recovering force is applied to the elastic part 72 by forcing gas into the bag body 72a of the elastic part 72, the matter forced into the bag body 72a is not necessarily gas, for example, liquid or gel can be forced into the bag body 72a. That is, the matter that can apply the elastic recovering force to the elastic part 72 when it is forced into the bag body 72a can be used.

In the eighth preferred embodiment, the elastic part 84 is fixed to the pair of locking parts 82, 83 by the pair of stop plates 84a, 84b, however the fixing method of the elastic part 84 is not limited thereto. For example, a hook can be provided on the both ends of the expansion coil spring comprising the elastic part and a stop part where the both hooks of the elastic part can be hooked can be provided to the pair of locking parts, and the both hooks of the elastic part can be hooked to the both stop parts. The elastic part can be fixed to the pair of locking parts by screwing down and fix the upper and lower end portions of the elastic part to the pair of locking parts.

Moreover, the uneven parts of a V shape whose outer shapes mate with each other are formed on the lower end surfaces 82f, 83f of the locking parts 82, 83, however, the uneven parts of a V shape are not necessarily formed on the lower end surfaces 82f, 83f of the locking parts 82, 83. For example, the uneven parts of a rectangular shape can be formed on the lower end surfaces 82f, 83f of the locking parts 82, 83, if the locking part 82 and locking part 83 can be positioned with each other.

In the tenth preferred embodiment, the cylindrical part 104a of the guide pin 104 is fixed to the locking part 102 by the pair of flanges 104b, 104c so as to fix the guide pin 104 thereto, however, the fixing method of the guide pin is not limited thereto. For example, the both end parts of the guide pin can be fixed by solder to the canopy plate and the bottom wall plate of the locking part to fix the guide pin. That is, it is all right if the guide pin is fixed to the locking part. A rivet such as a round-head rivet, a countersunk rivet, a flat-head rivet, or an oval countersunk head rivet can be used for the guide pin 104. Moreover, the cylindrical part 104a of the guide pin 104 is inserted to the internal circumference part 32a of the elastic part 32, however, the cylindrical part of the guide pin is not necessarily loosely inserted to the internal circumference part of the elastic part if the structure can prevent that the elastic part 32 is dropped out from the loose insert groove 9f of the locking part 102.

POSSIBILITY OF UTILIZATION IN INDUSTRY

In the closing block of the frame of the first invention, the second locking part provided to the another end side of the cut of the rim is loosely inserted between the first locking part fixed to one end side of the cut of the rim and one end side of the rim and the second locking part is urged to one end side of the rim by the urging part provided between the first urging part and the second urging part. Therefore, the lens can be certainly fixed to the rim even if the process precision of the outer shape of the lens to be inserted to the rim is worse.

Because the inner shape of the rim is expanded by pulling out the cut of the rim and is shrunk via the urging part by releasing to close the cut of the rim, the lens to be inserted to the rim can be exchanged without using an exclusive screwdriver. Therefore, a layman who is not a specialist of glasses, for example the user of the glasses can easily exchange the lens.

The closing block of the frame of the second invention has a following effect in addition to the effects of the closing block of the frame of the first invention. In the closing block of the frame of the second invention, the second locking part urged to one end side of the rim by the urging part or the another end side of the rim is held by the pair of guide parts of the first locking part so as to be movably guided to one end side of the rim. Therefore, the second locking part can be moved by the urging part to one end side of the rim without rattling. Thus, when the cut of the rim is closed by the urging force of the urging part, the mispositioning of one end side of the rim and the another end side of the rim can be prevented and the lens can be certainly fixed to the rim.

The closing block of the frame of the third invention has a following effect in addition to the effects of the closing block of the frame of the second invention. In the closing block of the frame of the third invention, the stop projection of the second locking part is formed on the second locking part or the another end side of the rim and the stop projection is movably put into the guide groove that is formed in the guide part along the moving direction of the second locking part or the another end side of the rim. Therefore, when the second locking part or the another end side of the rim moves between the pair of guide parts, it is prevented that the second locking part is dropped out from between the first locking part and one end side of the cut of the rim. Thus, it is prevented that the second locking part is dropped out from between the first locking part and one end side of the rim during the use of the frame and the lens is dropped out from the rim.

The closing block of the frame of the fourth invention has a following effect in addition to the effects of the closing blocks of the frames of the second and third inventions. In the closing block of the frame of the fourth invention, the moving position of the second locking part or the another end side of the rim urged to one end side of the rim by the urging force of the urging part is restricted by the restricting part of the first locking part. Therefore, for example, when the lens is removed from the rim, it is prevented that the second locking part is jumped out from between the first locking part and one end side of the rim by the urging force of the urging part. When the lens is removed from the rim, the moving position of the second locking part or the another end side of the rim is restricted by the restricting part. Therefore, it is prevented that the inner shape of the rim is extremely shrunk by the urging force of the urging part and the distortion of the shape of the rim can be prevented.

The closing block of the frame of the fifth invention has a following effect in addition to the effects of the closing blocks of the frames of the first to fourth inventions. In the closing block of the frame of the fifth invention, because the urging part provided between the first and the second locking parts is installed to the second locking part, the urging part can be installed between the first locking part and the second locking part by loosely inserting the second locking part between the first locking part and one end side of the rim. Therefore, in assembling the closing block, the installing operation of the urging part and loosely inserting operation of the second locking part are not necessarily made separately, and the assembling operation of the closing block can be made simple.

The closing block of the frame of the sixth invention has a following effect in addition to the effects of the closing blocks of the frames of the first to fifth inventions. In the closing block of the frame of the sixth invention, the guide rail part that is provided to the first locking part is inserted to the insert hole formed in the second locking part or the another end side of the rim. Therefore, when the second locking part is urged by the urging part, it is prevented that the second locking part is dropped out from between the first locking part and one end side of the cut of the rim and the lens is dropped out from the rim.

Because the guide rail part is provided between the first locking part and one end side of the rim along the urging direction of the urging part and the guide rail part is inserted to the insert hole formed in the second locking part or the another end side of the rim, the second locking part can be guided along the urging direction of the urging part. Therefore, when the cut of the rim is closed via the second locking part that is urged by the urging part, the mispositioning of one end side and the another end side of the rim can be prevented and the lens can be certainly fixed to the rim.

The closing block of the frame of the seventh invention has a following effect in addition to the effects of the closing block of the frame of the sixth invention. In the closing block of the frame of the seventh invention, because the stop hole being capable of receiving the guide rail part of the first locking part is formed to the urging part urging the second locking part, the urging part can be fixed to the first locking part when the guide rail part is inserted into the stop hole. Therefore, it can be prevented that the urging part is dropped out from between the first locking part and the second locking part.

In the closing block of the frame of eighth invention, the urging part urging one of the first locking part and second locking part toward the another one of the first and second locking parts is provided between the first locking part provided on one end side of the cut of the rim and the second locking part provided on the another end side of the cut of the rim. Therefore, the lens can be certainly fixed to the rim by the urging force of the urging part even if the process precision of the outer shape of the lens to be inserted to the rim is worse.

Because the inner shape of the rim is expanded by pulling to open the cut of the rim and shrunk via the urging part by releasing to close the cut of the rim, the lens to be inserted to the rim can be exchanged without using an exclusive screwdriver. Thus, a layman who is not a specialist of the glasses, for example the user of the frame can easily exchange the lens.

The closing block of the frame of the ninth invention has a following effect in addition to the effects of the closing block of the frame of the eighth invention. In the closing block of the frame of the ninth invention, the pair of stop parts are provided to the both end sides of the urging part in its urging direction and one of the stop parts is engaged to the first fixing part provided to the first locking part and the another one of the stop parts is engaged to the second fixing part provided to the second locking part. Therefore, it is not necessary that the both end sides of the urging part are connected to the first and second locking parts by solder, when the urging part is provided between the first locking part and the second locking part, and the installing operation of the urging part can be made simple.

The closing block of the frame of the tenth invention has a following effect in addition to the effects of the closing blocks of the frames of the eighth and ninth inventions. In the closing block of the frame of the tenth invention, because the facing surfaces of the first and second locking parts are formed in an uneven shape so as to mate with each other, when one of the first and second locking parts is urged toward the another one of the first and second locking parts, the facing surfaces of the first and second locking parts are mated with each other and the position of the both locking parts can be determined. Therefore, the mispositioning of the both end sides of the cut of the rim can be prevented and the lens can be certainly fixed to the rim.

In the frame of the eleventh invention, because the closing block of one of the first to tenth inventions is provided to the clincher endpiece, the closing block can be provided in the outer side of the outer corner of the user's eye. Therefore, it can be prevented that the closing block obstructs the user's view when the user wears the frame. For example, the appearance of the frame can be maintained by covering the closing block by the clincher endpiece.

In the frame of the twelfth invention, because the closing block of one of the first to tenth invention is provided to the connecting part of the bridge and the rim, the closing block can be positioned in the upper part of the user's nose. Therefore, it can be prevented the closing block obstructs the user's view when the user wears the frame. For example, the appearance of the frame can be maintained by covering the closing block by the bridge.

What is claimed is:

1. A closing block of a frame of glasses for fixing a lens into a rim a part of which is cut comprising:
    a first locking part fixed to one end side of a cut of said rim, said first locking part having a loose insert groove of a longitudinal groove formed being one side surface open, a canopy plate covering an upper part of said loose insert groove, a bottom wall plate covering a lower part of said insert groove, and a side wall plate covering three side surfaces of said loose insert groove;
    a second locking part extended from another end side of the cut of said rim to said loose insert groove, said second locking part being loosely inserted into said loose insert groove being movable up and down and formed so as to cover the open part of said loose insert groove with the another end side of said rim in a condition that said second locking part is loosely inserted into said loose insert groove; and
    an urging part accommodated in said loose insert groove and applying elastic recovering force for urging said second locking part loosely to said loose insert groove to the one end side of said rim.

2. According to the closing block of the frame of claim 1, said first locking part is formed so as to hold one of said second locking part and the another one of end side of said rim by a pair of side wall plates covering both sides of said loose insert groove to guide it slidably to the one end side of said rim.

3. According to the closing block of the frame of claim 2, said first locking part has a guide groove formed in said side wall plate along an up and down moving direction of one of said second locking part and the another end side of said rim; and the closing block of the frame further comprising a stop projection slidably fitted into said guide groove being formed on one of said second locking part and the another end side of said rim.

4. According to the closing block of the frame of claim 2, said first locking part has a restricting part for restricting an up and down moving position of one of said second locking part and the another end side of said rim.

5. According to the closing block of the frame of claim 1, said urging part is provided to said second locking part.

6. According to the closing block of the frame of claim 1, said first locking part has a guide rail part formed between said first locking part and the one end side of said rim along an urging direction of said urging part; and the closing block of the frame further comprising an insert hole where said guide rail part can be inserted being formed on one of said second locking part and the another end side of said rim.

7. The closing block of the frame of claim 6 further comprising a stop hole where said guide rail part can be inserted being formed on said urging part.

8. According to the closing block of the frame of claim 1, the closing block is provided to a clincher endpiece.

9. The closing block of the frame of claim 1, further comprising a pair of rims where a lens is inserted and a bridge for connecting the pair of rims; wherein the closing block is provided to a connecting part of said bridge and said rims.

10. According to the closing block of the frame of claim 1, said urging part has a pair of plate parts and a bent part formed from said pair of plate parts, wherein said bent part and said pair of plate parts are formed in a boomerang shape so as to apply elastic recovering force toward a non-facing surfaces side of said pair of plate parts via said bent part by compressing said pair of plate parts toward their facing surfaces side.

11. According to the closing block of the frame of claim 1, said urging part is formed by a cylindrical shape rolled up in almost C shape, wherein said urging part is formed so as to apply elastic recovering force in a direction of expanding its outer diameter by compressing to shrink the outer diameter of the cylindrical shape.

12. According to the closing block of the frame of claim 1, said urging part is formed by a compression coil spring formed by rolling up a line material in a spiral shape, wherein said urging part is formed so as to apply elastic recovering force in an expanding direction of the compression coil spring by compressing to shrink the compression coil spring.

13. According to the closing block of the frame of claim 1, said urging part is formed of a volute coil spring formed by rolling up a plate material spirally to almost a conic shape, wherein said urging part is formed so as to apply elastic recovering force in an expanding direction of the volute coil spring by compressing to shrink the volute coil spring.

14. According to the closing block of the frame of claim 1, said urging part has a coil part formed by rolling up a line material spirally to a cylindrical shape, an upper arm part extended slanted upward from said coil part and a lower arm part extended slanted downward from said coil part, wherein said lower arm part, said coil part and said upper arm part are formed in a boomerang shape so as to apply elastic recovering force in a non-facing surfaces side of said upper arm part and said lower arm part via said coil part by compressing said upper arm part and lower arm part toward their facing surfaces side.

15. According to the closing block of the frame of claim 1, said urging part is formed of a synthetic resin having elastic recovering force.

16. According to the closing block of the frame of claim 1, said urging part has a bag body formed in a bag shape by synthetic resin having expansion, wherein said urging part is formed so as to apply elastic recovering force by forcing a matter of gas, liquid or gel into said bag body.

17. A closing block of a frame of glasses for fixing a lens into a rim a part of which is cut comprising:

a first locking part fixed to an upper end side of a cut of said rim, said first locking part defining a first open hollow;

a first fixing part provided to said first locking part;

a second locking part fixed to a lower end side of the cut of said rim, said second locking part defining a second open hollow;

a second fixing part provided to said second locking part;

an urging part provided in said first open hollow of said first locking part and said second open hollow of said second locking part, said urging part being oriented to urge one of said first locking part and said second locking part toward another one of said first locking part and said second locking part; and a pair of stop parts provided on both end side parts of said urging part in its urging direction and received by said first and second fixing parts.

18. According to the closing block of the frame of claim 17, facing surfaces of said first locking part and said second locking part are formed in an uneven shape mating with each other.

19. An eyeglasses frame comprising:

a rim including a cut portion defining an upper rim portion and a lower rim portion;

a first locking part fixed to said upper rim portion, said first locking part being substantially parallelepiped shaped defining a hollow therein with one open side;

a second locking part fixed to said lower rim portion, said second locking part including a pair of stop extensions disposed in said hollow through said open side; and an urging member disposed in said hollow between said pair of stop extensions of said second locking part and a bottom wall of said first locking part, said urging member being oriented to urge said first and second locking part toward each other.

* * * * *